(12) United States Patent
Kohstall

(10) Patent No.: US 9,599,992 B2
(45) Date of Patent: Mar. 21, 2017

(54) LAUNCH-CONTROLLED UNMANNED AERIAL VEHICLES, AND ASSOCIATED SYSTEMS AND METHODS

(71) Applicant: Nixie Labs, Inc., Los Altos, CA (US)

(72) Inventor: Christoph Kohstall, Los Altos, CA (US)

(73) Assignee: NIXIE LABS, INC., Palo Alto, CA (US)

(*) Notice: Subject to any disclaimer, the term of this patent is extended or adjusted under 35 U.S.C. 154(b) by 0 days.

(21) Appl. No.: 14/746,401

(22) Filed: Jun. 22, 2015

(65) Prior Publication Data

US 2016/0139602 A1 May 19, 2016

Related U.S. Application Data

(60) Provisional application No. 62/072,291, filed on Oct. 29, 2014, provisional application No. 62/016,010, filed on Jun. 23, 2014.

(51) Int. Cl.
*G05D 1/10* (2006.01)
*B64C 39/02* (2006.01)
*G05D 1/12* (2006.01)
*A44C 25/00* (2006.01)

(52) U.S. Cl.
CPC ........ *G05D 1/101* (2013.01); *B64C 39/024* (2013.01); *B64C 39/028* (2013.01); *G05D 1/12* (2013.01); *A44C 25/00* (2013.01); *B64C 2201/024* (2013.01); *B64C 2201/027* (2013.01); *B64C 2201/08* (2013.01); *B64C 2201/108* (2013.01); *B64C 2201/141* (2013.01); *B64C 2201/20* (2013.01)

(58) Field of Classification Search
CPC ........ G05D 1/12; G05D 1/101; B64C 39/024; B64C 2201/08; B64C 2201/20; B64C 27/08; B64C 2203/00; B64C 39/028
USPC .................................................. 244/17.23
See application file for complete search history.

(56) References Cited

U.S. PATENT DOCUMENTS 2,162,066 A 6/1939 De Asis
2,350,608 A 6/1944 Griffith
3,092,060 A 6/1963 Reid
(Continued)

FOREIGN PATENT DOCUMENTS

CN 102963230 A 3/2013
DE 202012000229 U1 4/2012
WO WO 2015179797 A1 * 11/2015 ............. B64C 19/00

OTHER PUBLICATIONS www.razerzone.com/eidolon, Razer Eidolon; Apr. 4, 2014, http://web.archive.org/web/20140404065555/http://www.razerzone.com/eidolon.*

(Continued)

*Primary Examiner* — Aaron L Troost
(74) *Attorney, Agent, or Firm* — Shook, Hardy & Bacon L.L.P.

(57) ABSTRACT

Launch-controlled unmanned aerial vehicles, and associated systems and methods are disclosed. A computer-implemented method for operating an unmanned aerial vehicle in a representative embodiment includes detecting at least one parameter of a motion of the UAV as a user releases the UAV for flight. Based at least in part on the at least the one detected parameter, the method can further include establishing a flight path for the UAV, and directing the UAV to fly the flight path.

26 Claims, 25 Drawing Sheets

(56) References Cited

U.S. PATENT DOCUMENTS

| | | | |
|---|---|---|---|
| 3,713,249 | A | 1/1973 | Goodman |
| 5,615,847 | A | 4/1997 | Bourlett |
| 8,074,918 | B1 | 12/2011 | Monson et al. |
| 9,010,678 | B1 | 4/2015 | Hiller |
| 2009/0283629 | A1 | 11/2009 | Kroetsch et al. |
| 2010/0243794 | A1 | 9/2010 | Jermyn et al. |
| 2012/0056041 | A1 | 3/2012 | Rhee et al. |
| 2012/0232718 | A1 | 9/2012 | Rischmuller et al. |
| 2013/0206915 | A1 | 8/2013 | Desaulniers |
| 2013/0314502 | A1 | 11/2013 | Urbach et al. |
| 2014/0026802 | A1 | 1/2014 | Parks et al. |
| 2014/0034776 | A1 | 2/2014 | Hutson |
| 2016/0122038 | A1* | 5/2016 | Fleischman ............... B64F 1/20 701/2 |

OTHER PUBLICATIONS

First Phlight, "4 steps to Launch Your Phantom by Hand and Catch it When Landing", Feb. 17, 2014, https://www.youtube.com/watch?v=7IECm1f3BJg.* www.bladehelis.com, Blade 350 QX, Oct. 7, 2013, http://web.archive.org/web/20131007172043/http://www.bladehelis.com/ProdInfo/Files/BLH7800-Manual_EN.pdf.*

Farokhmanesh, M., "Razer's April Fools' Day joke offers 'next-level' selfies and video game perspectives," Apr. 4, 2014; http://www.polygon.com/2014/4/1/5571044/razers-april-fools-day-joke-teases-the-power-of-drones.

International Search Report and Written Opinion for Application No. PCT/US2015/036967; Applicant: Nixie Labs, Inc.; Date of Mailing: Oct. 12, 2015; 23 pages.

* cited by examiner

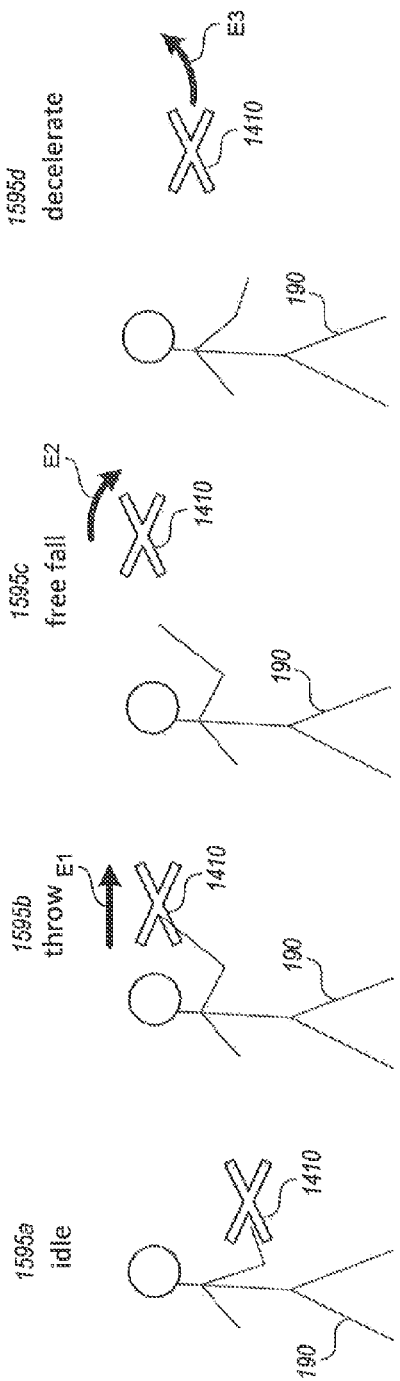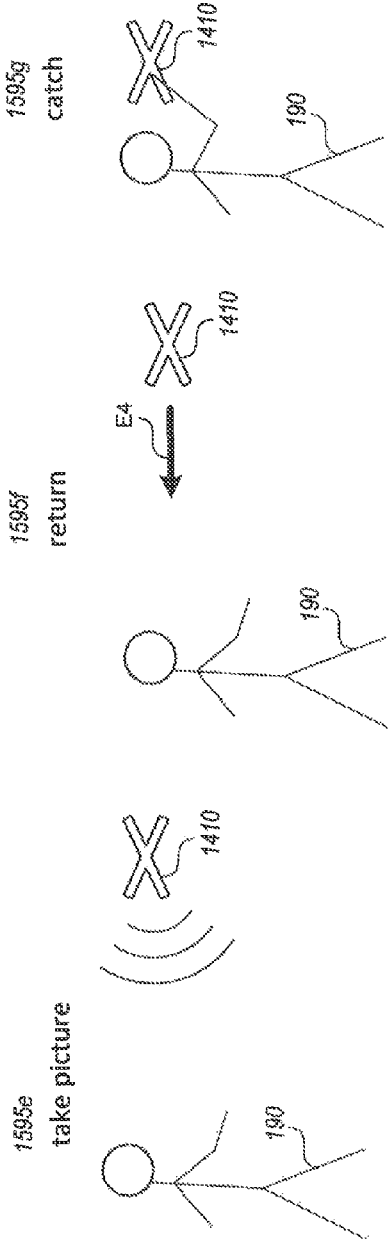
Fig. 15A  Fig. 15B  Fig. 15C  Fig. 15D
Fig. 15E  Fig. 15F  Fig. 15G

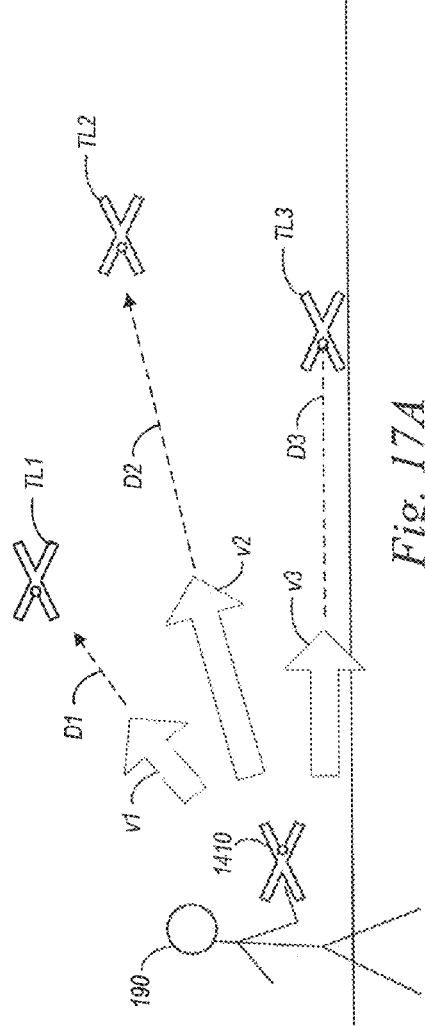
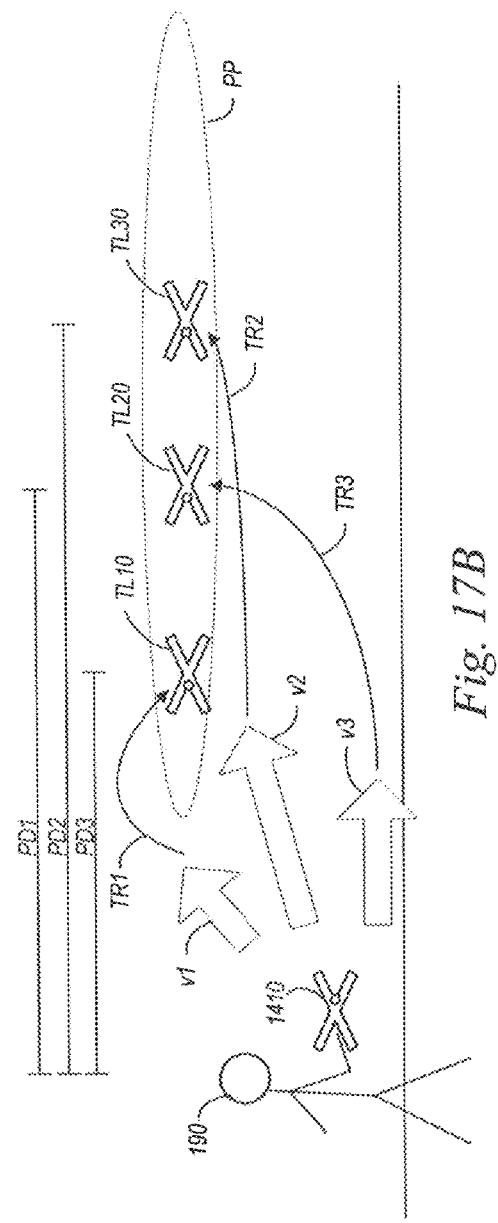
Fig. 17A
Fig. 17B

LAUNCH-CONTROLLED UNMANNED AERIAL VEHICLES, AND ASSOCIATED SYSTEMS AND METHODS

CROSS-REFERENCE TO RELATED APPLICATIONS

The present application claims priority to, and incorporates by reference, in their entireties, the following U.S. Provisional Applications 62/016,010, filed on Jun. 23, 2014, and 62/072,291, filed on Oct. 29, 2014.

TECHNICAL FIELD

The present technology is directed generally to wearable and/or gesture-controlled unmanned aerial vehicles, and associated systems and methods.

BACKGROUND

Unmanned aerial vehicles (UAVs) have been used in a wide variety of capacities to provide surveillance and perform other tasks. Personal UAVs have become very popular over the last several years as a tool to provide individuals with an aerial perspective. One drawback with personal UAVs, even small personal UAVs, is that although they may be portable, they typically require at least a backpack, bag or purse for transportation from one site to another. Conventional UAVs are typically remote controlled, or follow a pre-programmed trajectory, or autonomously determine a trajectory via input parameters from sensors. Another drawback with existing UAVs is that, despite the apparent level of programming and automation, they may still be difficult and/or non-intuitive to control.

BRIEF DESCRIPTION OF THE DRAWINGS

FIGS. 15A-15G illustrate a sequence of steps for operating a UAV in accordance with an embodiment of the present technology, with the UAV shown in a first phase (FIG. 15A), a second phase (FIG. 15B), a third phase (FIG. 15C), a fourth phase (FIG. 15D), a fifth phase (FIG. 15E), a sixth phase (FIG. 15F), and a seventh phase (FIG. 15G).

FIGS. 17A-17B schematically illustrate techniques for determining and flying to a UAV target location in a first mode and a second mode, respectively, in accordance with embodiments of the present technology.

Figure 1:
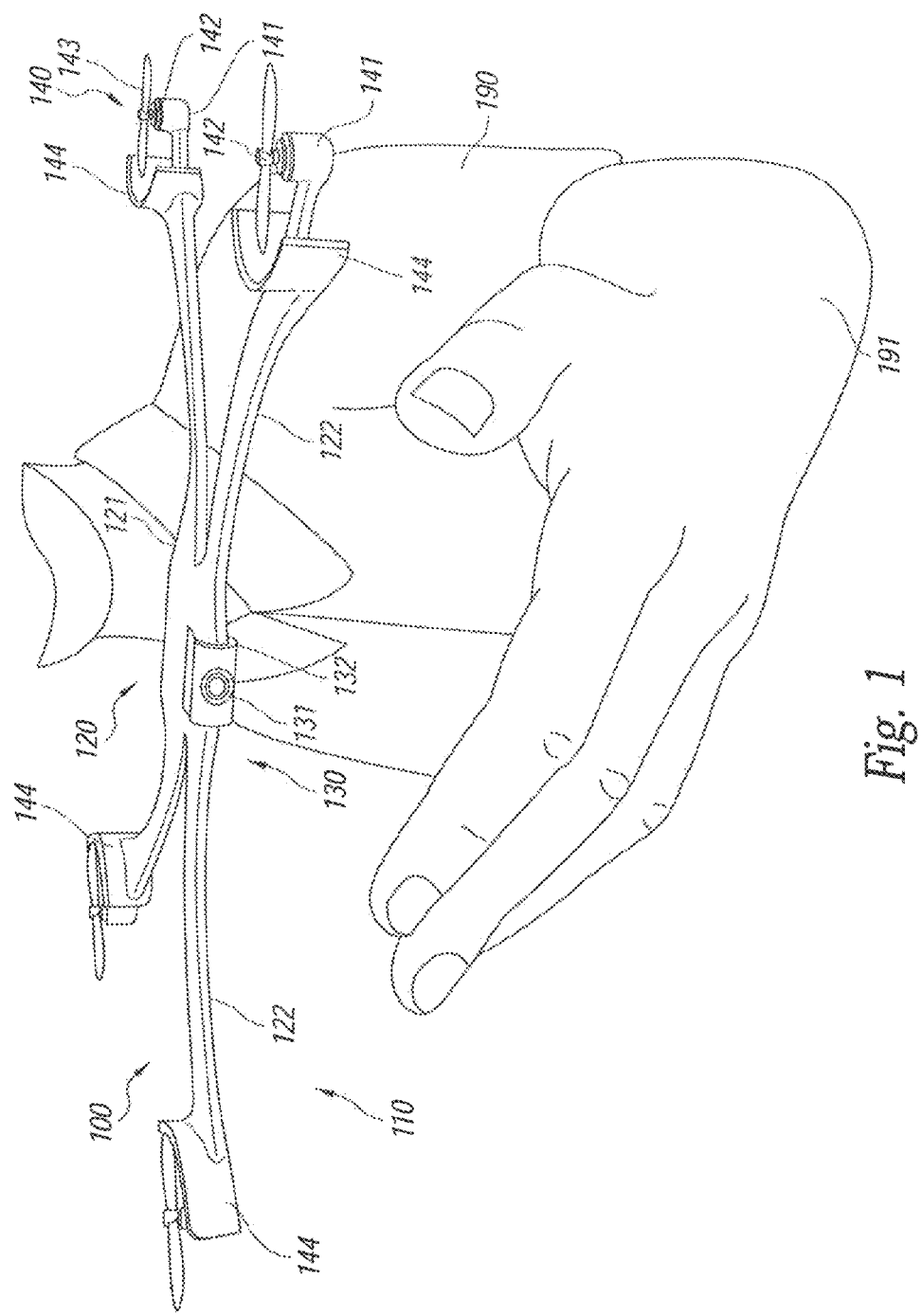
FIG. 1 is a partially schematic, isometric illustration of a system that includes an unmanned aerial vehicle (UAV) launched by a user, in accordance with an embodiment of the present technology.

The headings provided herein are for convenience only and do not necessarily affect the scope or meaning of the embodiments. Further, the drawings have not necessarily been drawn to scale. For example, the dimensions of some of the elements in the Figures can be expanded or reduced to help improve the understanding of the embodiments. Similarly, some components and/or operations can be separated into different blocks or combined into a single block for the purposes of discussion of some of the embodiments. Moreover, while the various embodiments are amenable to various modifications and alternative forms, specific embodiments have been shown by way of example in the drawings and are described in detail below.

DETAILED DESCRIPTION

The presently disclosed technology is directed generally to wearable and/or launch-controlled unmanned aerial vehicles (UAVs) and associated systems and methods. The methods include methods of use, methods of instructing or directing use and methods of manufacture. Specific embodiments are described below in the context of corresponding representative Figures. Several details describing structures or processes that are well-known and often associated with UAVs, but that may unnecessarily obscure some significant aspects of the present technology, are not set forth in the following description for purposes of clarity. Moreover, although the following disclosure sets forth several embodiments of different aspects of the disclosed technology, several other embodiments of the technology can have different configurations or different components than those described in this section. As such, the disclosed technology may have other embodiments with additional elements, and/or without several of the elements described below with reference to FIGS. 1-18.

Many embodiments of the present disclosure described below may take the form of computer- or controller-executable instructions, including routines executed by a programmable computer or controller. Those skilled in the relevant art will appreciate that the disclosure can be practiced on computer systems other than those shown and described below. The technology can be embodied in a special purpose computer or data processor that is specifically programmed, configured or constructed to perform one or more of the computer-executable instructions described below. Accordingly, the terms "computer" and "controller" as generally used herein refer to any suitable data processor and can include Internet appliances and handheld devices, including palmtop computers, wearable computers, cellular or mobile phones, multi-processor systems, processor-based or programmable consumer electronics, network computers, minicomputers and the like. Information handled by these computers and/or controllers can be presented to a user, observer, or other participant via any suitable display medium, such as an LCD screen.

In particular embodiments, aspects of the present technology can be practiced in distributed environments, where tasks or modules are performed by remote processing devices that are linked through a communications network. In distributed computing environments, program modules or subroutines may be located in local and remote memory storage devices. Aspects of the technology described below may be stored or distributed on computer-readable media, including magnetically or optically readable or removable computer disks, as well as distributed electronically over networks. Data structures and transmissions of data particular to aspects of the present technology are also encompassed within the scope of particular embodiments of the present technology.

1. Overview

Certain aspects of the present technology are directed to wearable UAVs. As used herein, the term "wearable" refers generally to a UAV that can both fly and be worn by a user. This is to be distinguished from a UAV that is merely carried by the user when it is not being flown. Instead of merely being carried by the user, the UAV includes a structure that is shaped and configured to actively or passively conform to a body part of the user, so that the user can walk and/or perform other actions without having to hold the UAV in his or her hands. Representative wearable UAVs can be worn on the user's wrist (like a watch), or wrap around the upper arm, or on the users neck like a necklace, or on the user's shoulders (like a shirt, sweater, or a backpack), or on the user's finger (like a ring), or on the user's head (like glasses or a hat), or on the user's waist (like a belt or a fanny pack), on the user's feet (like sandals or shoes), or in other suitable manners. A common feature of the disclosed embodiments is that the structure that is wearable by the user remains a part of the UAV when the UAV is in flight. Particular embodiments of wearable UAV configurations are described further below with reference to FIGS. 1-13C.

Other aspects of the presently disclosed technology relate to techniques for controlling a UAV, in particular, techniques for determining a target location and/or target orientation for a UAV based on the manner in which the UAV is launched. For example, if the user throws the UAV straight up, the UAV can fly to a target location directly overhead. If the user throws the UAV laterally, the UAV moves away from the user. The distance between the user and the target location can be determined by the velocity vector (and/or related value) imparted by the user to the UAV as the user launches the UAV. Further features of the flight trajectory may be controlled by the exact path of the throw. For example, the user can instruct the UAV to circle around him or her by launching the UAV along a half circle. The user can also control or influence the UAV's behavior once it reaches the target location. For example, the user can instruct the UAV to turn and photograph the user, or the user can instruct the UAV to follow the user for additional photographs or videos. Particular embodiments of representative control techniques are described below with reference to FIGS. 14A-18.

2. Representative Wearable UAVs

FIG. 1 is a partially schematic, isometric illustration of a system 100 that includes a wearable UAV 110. In this particular embodiment, the UAV 110 can be configured to be hand-launched by a user 190, and can be worn around the user's wrist 191, as will be described in further detail later. The UAV 110 can include a structural support 120 that carries a propulsion system 140 and, in particular embodiments, a payload 130. The support 120 can include a central portion 121 and multiple, outwardly extending boom portions 122. The central portion 121 can house the payload 130 and other equipment, for example, a power source, one or more sensors, and/or a flight controller. In an embodiment shown in FIG. 1, the payload 130 includes a camera 131 supported by a pivot, swivel, gimbal and/or other mount 132 so that it can be pointed in any of multiple directions. The propulsion system 140 can include a plurality of motors 141 (e.g., one motor for each boom portion 122) coupled to the power source (shown in FIG. 2). Each motor 141 can include a shaft 142 attached to a propeller 143. In the example shown in FIG. 1, the UAV 110 has a quadrotor configuration, with four motors 141 and four corresponding propellers 143. In other embodiments, the propulsion system 140 can have other suitable configurations.

As is also shown in FIG. 1, the UAV 110 can include one or more shields or shield portions 144 positioned around the propellers 143. In a particular embodiment, the shield 144 portions can partially surround the propeller 143, and can align when the boom portions 122 are folded around the user's wrist 191 to provide a discontinuous cylinder around all four propellers 143. Accordingly, each shield portion 144 forms a quarter ring in the flyable configuration shown in FIG. 1, and a staggered, full ring when the UAV 110 is worn.

Figure 2:
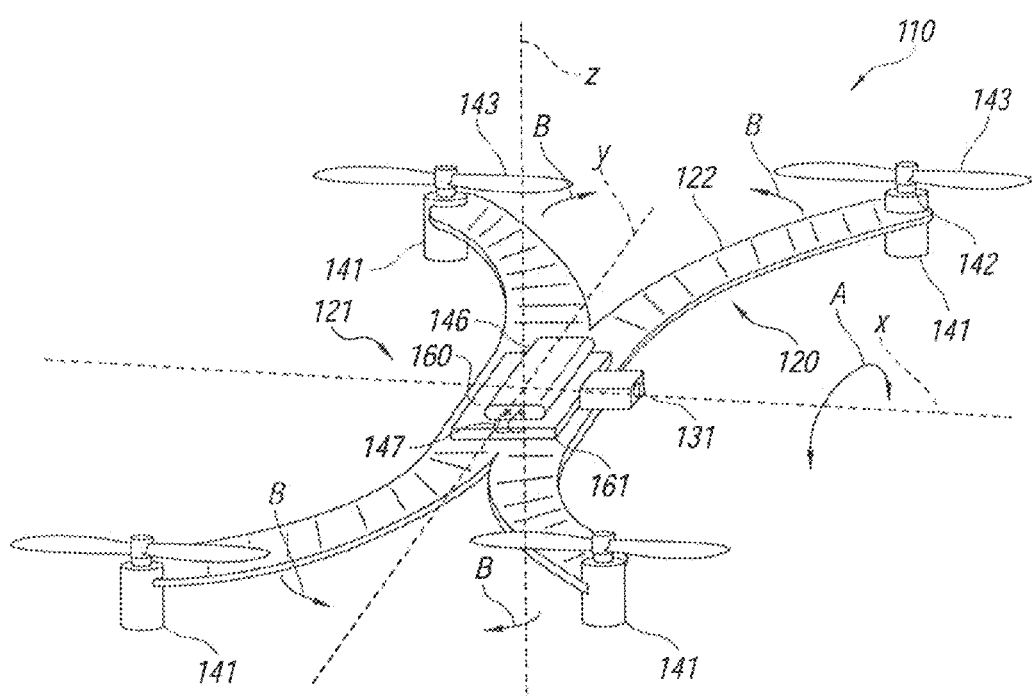
FIG. 2 is a partially schematic, isometric illustration of a UAV in a flyable configuration, in accordance with an embodiment of the present technology.

FIG. 2 is a partially schematic, top isometric illustration of a representative UAV 110, illustrating further structural and functional features of the UAV. The central portion 121 of the UAV's support 120 carries a controller 160 in addition to the camera 131. The controller 160 can include a controller board 161 (e.g., a printed circuit board) that in turn carries multiple circuit elements (described later) used to control the UAV 110. The central portion 121 can also carry a power source 146 used to power the controller 160, the camera 131, and the motors 141. In a representative embodiment, the power source 146 can include a battery, for example, a 3.7-volt lithium polymer battery with a capacity of 250 mAh. The power source 146 can be connected to power-consuming devices (e.g., the motors 141, camera 131 and controller 160) with wiring 147. In a particular embodiment, the power source 146 can provide for a total flight time of about five minutes. This is sufficient for 50 basic out-and-back "boomerang" flights of about six seconds each. In other embodiments, the power source 146 can include other suitable devices, for example, ultracapacitors to provide high peak power. In particular embodiments, the battery can be charged at any suitable charging station, for example, a computer or power outlet having a compatible charging port. In other embodiments, the battery can be charged by another wearable element, in addition to or in lieu of the computer or power outlet. For example, the user can wear an additional wristband, or another article of clothing (e.g., a shoe) that includes a charger that is releasably coupled to the power source 146 when the UAV 110 is being worn. In further particular embodiments, the wearable charger can include a rechargeable battery that has a significantly greater charge capacity than the on-board power source 146, and that is woven or otherwise incorporated into the article of clothing. In still further embodiments, the wearable recharging device can include one or more solar panels, e.g., woven into or otherwise integrated with the user's clothing. Accordingly, the user can launch the UAV 110 on a series of multiple, relatively short-duration flights or missions, with the UAV returning to the user between flights for charging.

The components of the UAV 110 can be distributed over the support 120 so as to balance the UAV 110. Accordingly, in a neutral position, the UAV will not rotate about any of the illustrated x, y, or z axes. The propellers 143 can be individually controlled to direct the UAV 110 along any of the x, y, or z axes, and/or rotate the UAV about any of the foregoing axes during flight. The propellers 143 can each face upwardly, and can be in the same horizontal plane to reduce or eliminate trim loads. In a representative embodiment, the motors 141 driving the propellers 143 can be approximately 20 mm long and approximately 7 mm in diameter, with a brushed coreless configuration, or a brushless motor in combination with an electronic speed controller. The propellers 143 can be approximately 56 mm in diameter. In a particular embodiment, the propellers can be made from soft cloth or other soft materials to avoid injuring the user and/or others. For example, the entire propeller or just the tips of the propeller can include soft cloth, with or without an internal supporting structure. For example, in particular embodiments, the propellers 143 can include one or more internal weights (within the cloth) that give the propellers 143 a suitable aerodynamic shape when the propellers 143 rotate (e.g., under centrifugal forces). Accordingly, in a particular embodiment, the overall weight of the UAV 110 can be from about 30 to about 70 grams, and the thrust provided by the motors 141 and the propellers 143 can be about 50-100 grams, with the difference in weight available for other components, e.g., the payload 130 and/or other equipment. These components can include cameras, speakers, wireless access points, radio receivers, transmitters, and/or other transceivers, autonomous control logic elements, propeller guards, fashionable accessories, and/or other aesthetic components that may be particularly suitable for the UAV 110 as it is being worn. In other embodiments, the UAV 110 can have a weight in the range of from about 10 to about 80 grams, or wider, with a lift capability of from about 1.5 to about 2 times the UAV weight. In still further embodiments, the UAV 110 can have other suitable weights with lift/weight capacities greater than 1.0, including 1.5 to 2.0.

In an embodiment shown in FIG. 2, the UAV 110 is changeable between a flyable configuration and a wearable configuration. For example, the boom portions 122 can be rotated downwardly relative to the central portion 121 about the x axis, as indicated by arrows A to assume a wristband configuration. Optionally, the boom portions 122 can flex about the z axis, as indicated by arrows B to narrow the width or profile of the resulting wrist band. Further embodiments of the configurable features of the UAV 110 are described below with reference to FIGS. 3-7. Suitable structures for facilitating the configuration changes are described below with reference to FIGS. 10A-10F.

Figure 3:
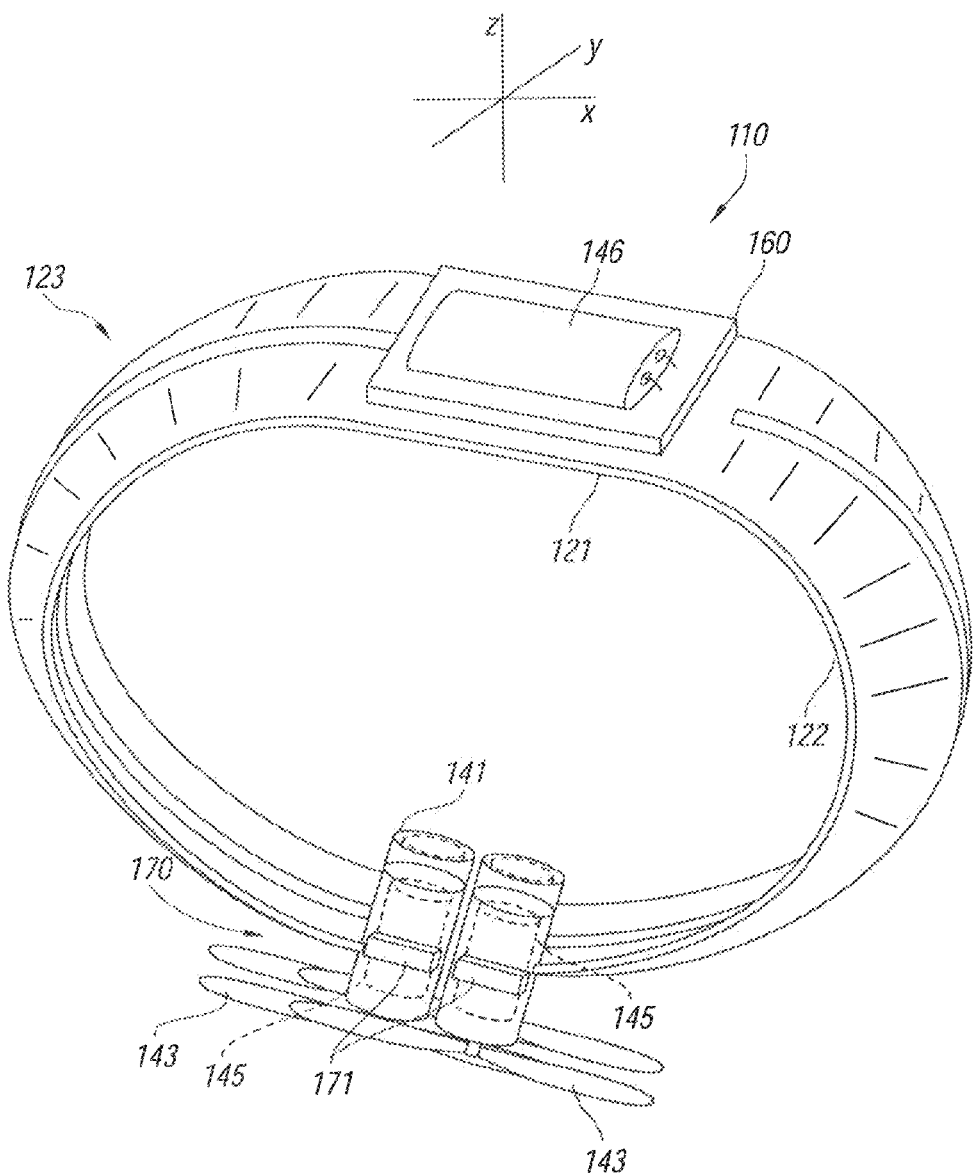
FIG. 3 is a partially schematic, isometric illustration of the UAV shown in FIG. 2 in a wearable configuration in accordance with an embodiment of the present technology.

FIG. 3 is a partially schematic illustration of the UAV 110 with the boom portions 122 flexed, bent, rotated, and/or otherwise reconfigured to form a wristband 123. For example, to form a wristband it can be advantageous for the boom portions 122 to be shaped in a manner that places the motors 141 at the edges of a planar rectangle (in a horizontal x-y plane) when in the flyable configuration shown in FIG. 2. In the wearable configuration shown in FIG. 3, it can be advantageous for the motors 141 to meet pair-wise to form a band in the y-z plane. One way to accomplish this result is to shape each boom portion 122 like the arc of a sine wave and bend the boom portions 122 around an axis that is perpendicular to a line connecting the motor 141 and the central portion 121. In particular embodiments, the boom portions 122 can be formed integrally with the central portion 121 to form a monolithic structure. In other embodiments, the boom portions 122 can be formed separately from the central portion 121 and then attached to the central portion 121. In any of these embodiments, the central portion 121 can optionally include stiffening features or other features that resist or limit the type of motion undergone by the central portion 121 when the user manipulates the boom portions 122.

The boom portions 122 can have a bi-stable configuration so as to preferentially snap, flip and/or otherwise readily change between the configuration shown in FIG. 2 and the configuration shown in FIG. 3. Further details of suitable bi-stable structures are described later with reference to FIGS. 10E-10F. In addition to (or in lieu of) the bi-stable configuration, the UAV 110 may include features that resist inadvertently changing from the wearable configuration shown in FIG. 3 to the flyable configuration shown in FIG. 2. For example, each of the motors 141 can include one or more motor magnets 145. The poles of the motor magnets 145 can be oriented so that, in the wearable configuration shown in FIG. 3, at least two of the motor magnets 145 are attracted toward each other to maintain the UAV 110 in the wearable wristband configuration. To convert from the wearable configuration to the flyable configuration, the user deliberately moves the attached boom portions 122 apart from each other. The boom portions 122 can then spring back to the positions shown in FIG. 2.

In other embodiments, the motor magnets 145 may be too weak to perform the foregoing clamp or closure function, and/or may not be amenable to a position that supports the mutual attraction described above. Accordingly, the UAV 110 can include a separate closure device 170 for performing this function. In an embodiment shown in FIG. 3, the closure device 170 includes external magnets 171 that are positioned to keep the wristband 123 closed or at least partially closed until the user deliberately spreads the boom portions 122 apart from each other to assume the flyable configuration shown in FIG. 2.

Figure 4:
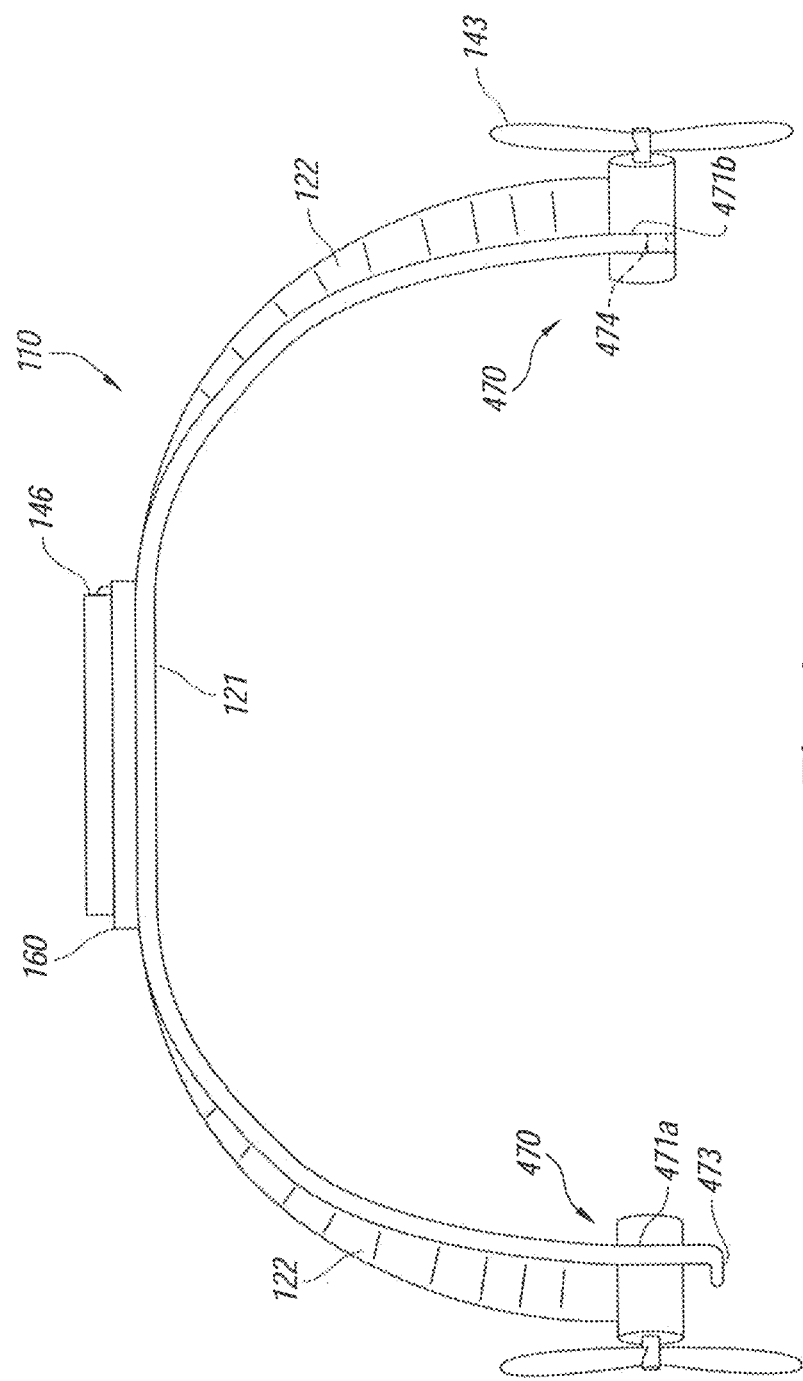
FIG. 4 is a partially schematic, side view of the UAV shown in FIG. 2 during conversion between a flyable configuration and a wearable configuration.
Figure 5:
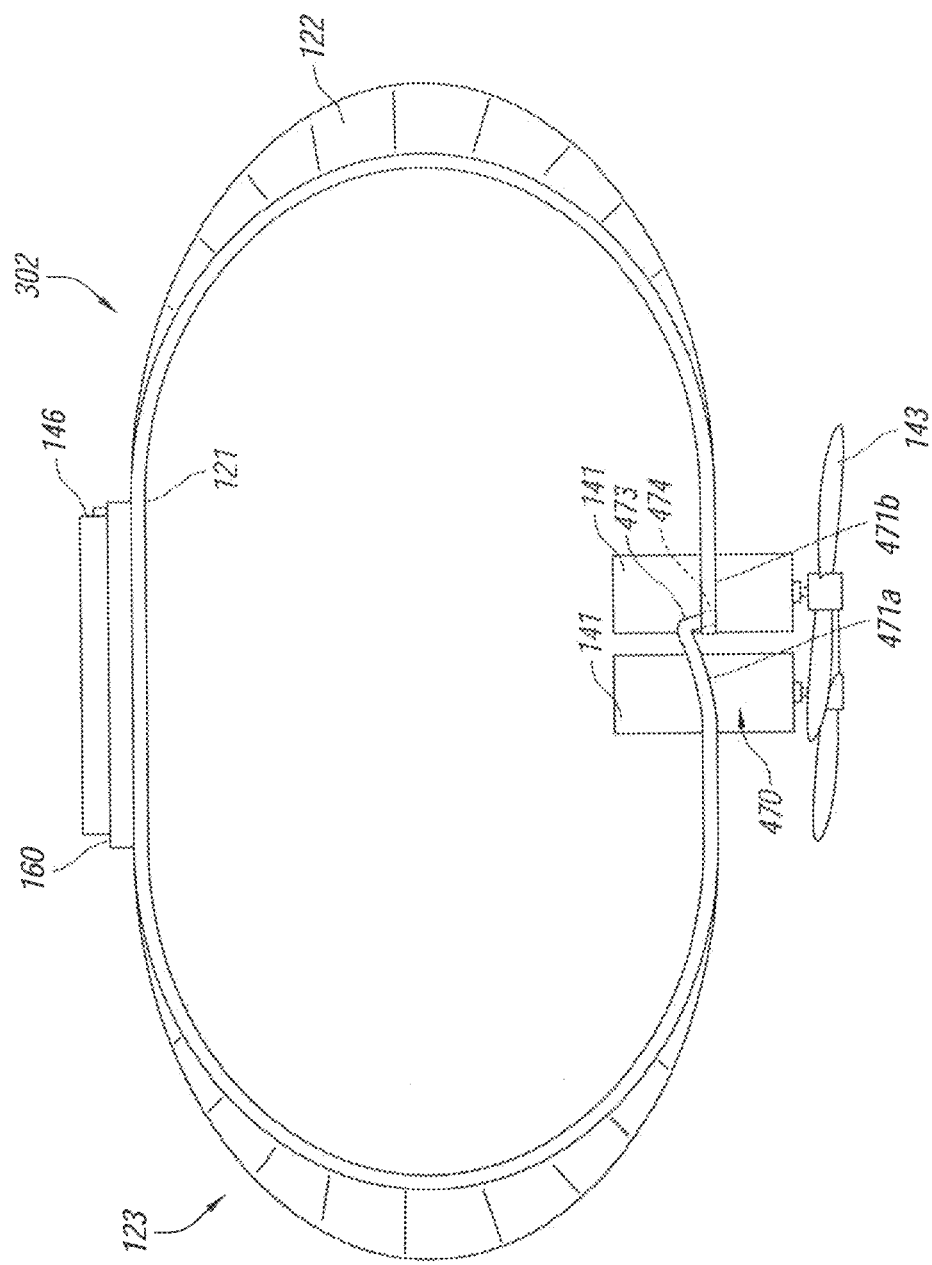
FIG. 5 is a partially schematic, end view of the UAV shown in FIG. 2 in a wearable configuration with a wristband clasp in accordance with another embodiment of the present technology.

FIG. 4 illustrates the UAV 110 with a closure device 470 arranged in accordance with another embodiment of the present technology. In this embodiment, the closure device 470 can include a first clasp member 471a on one boom portion 122 and a second clasp member 471b on another boom portion 122. The first clasp member 471a can have a prong 473, and the second clasp member 471b can have an aperture 474. When the oppositely-facing boom portions 122 are bent or folded toward each other, as shown in FIG. 5, the first clasp member 471a releasably couples to the second clasp member 471b to releasably secure the UAV 110 in the wearable configuration.

Figure 6:
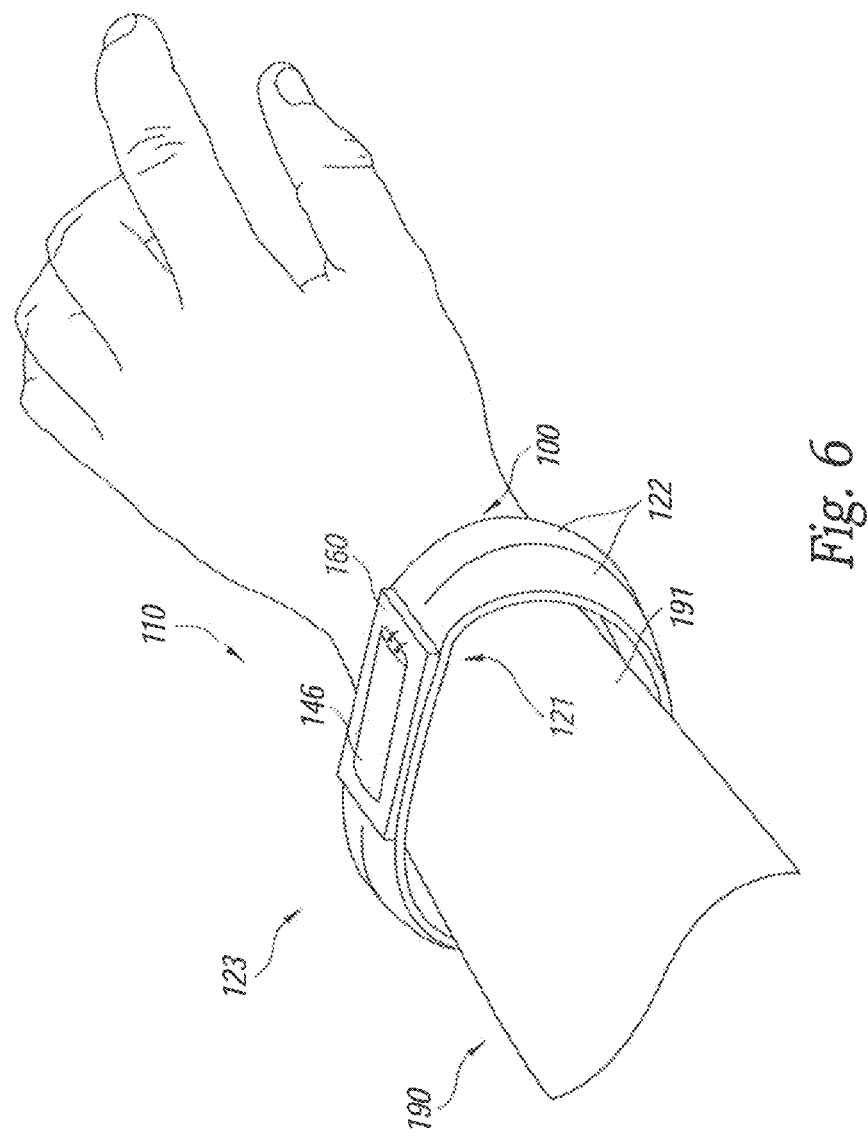
FIG. 6 is a partially schematic, isometric illustration of a UAV worn about a user's wrist in accordance with an embodiment of the present technology.

FIG. 6 illustrates the UAV 110 in a wearable configuration with the power source 146 and controller 160 facing upwardly or outwardly relative to the user's wrist 191. In particular embodiments, the controller 160 and/or other elements of the central portion 121 can house or carry other elements that the user may want to have access to when the UAV 110 is worn. Such features can include a time display (like a conventional watch), a personal assistant, dictation device, microphone, decorative features, and/or other features. The foregoing features can provide the full (or partial) functionality of a smart watch. Accordingly, the upward-facing orientation shown in FIG. 6 can facilitate the user's access to these elements.

Figure 7:
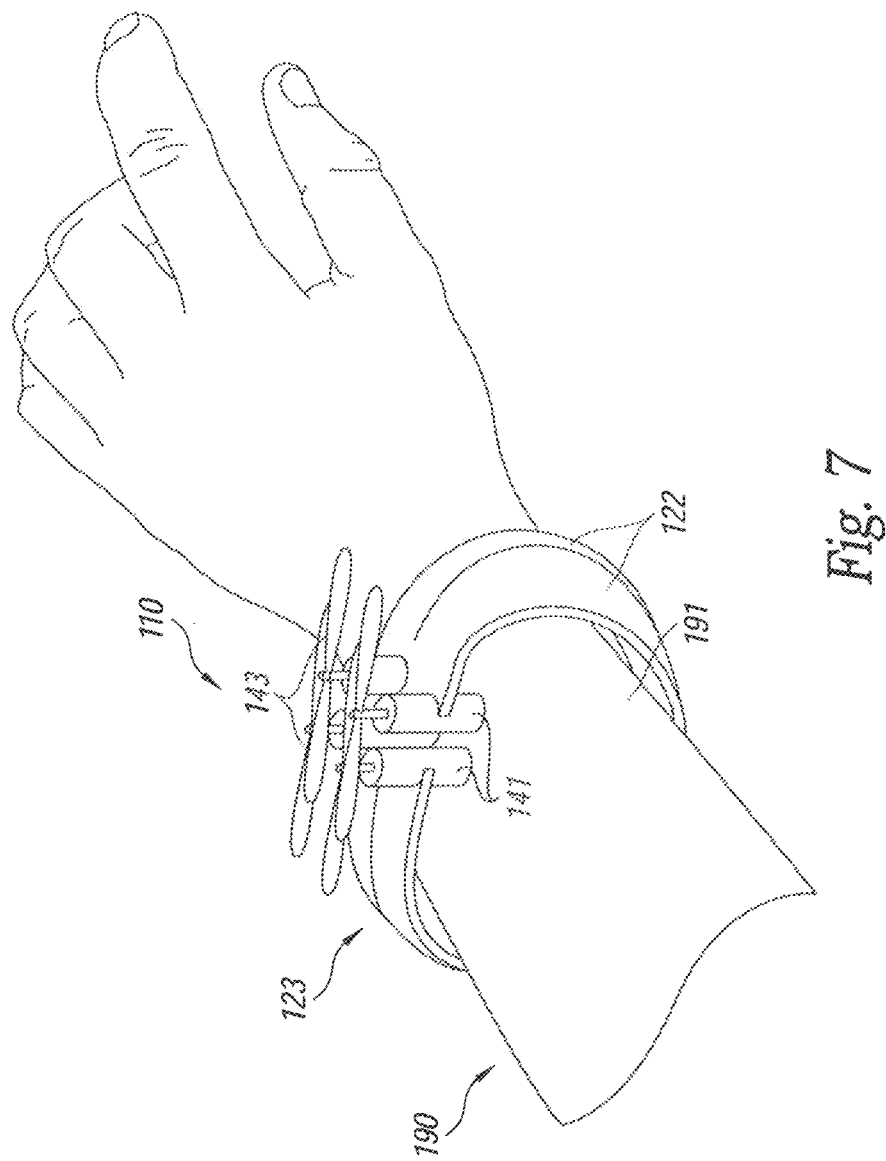
FIG. 7 is a partially schematic, isometric illustration of the UAV worn about the user's wrist in accordance with another embodiment of the present technology.

FIG. 7 illustrates the UAV 110 in another wearable configuration in which the motors 141 and propellers 143 face outwardly. The user can select whichever configuration he or she likes, depending, e.g., on whether the user wishes to access the controller 160 (and/or other features at the central portion 121), as shown in FIG. 6, or the motors 141 and propellers 143.

Figure 8:
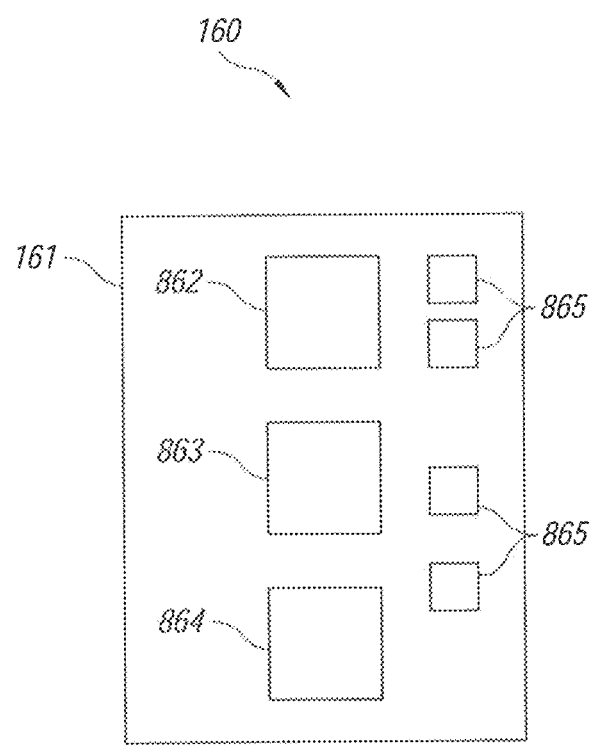
FIG. 8 is a schematic illustration of a flight controller having components configured in accordance with an embodiment of the present technology.

FIG. 8 is a partially schematic illustration of an embodiment of the flight controller 160 described above. The flight controller 160 can include a circuit board 161 on which multiple circuit elements are mounted. These circuit elements can include a radio frequency receiver or transceiver 862, a microcontroller 863, and/or one or more sensors 864. Representative sensors can include gyroscopes, accelerometers, pressure sensors, and/or other elements that facilitate operating and, in particular, guiding the UAV 110. The controller 160 can also include motor drivers 865, each of which can control one of the motors described above. The microcontroller 863 can receive and store inputs that are then directed to the motor drivers 865 for driving the motors as the UAV operates. For example, the gyroscope and accelerometer can sense the actual orientation state of the UAV. The microcontroller 863 can compare a desired state (e.g., flight path, vehicle orientation, and/or motion) to the actual state and can compute a suitable control signal for the motors in order to reach the desired state. The algorithm to accomplish this can be based on a PID controller. The motor drivers 865 can drive the speed of the motors according to the control signal.

Figure 9A:
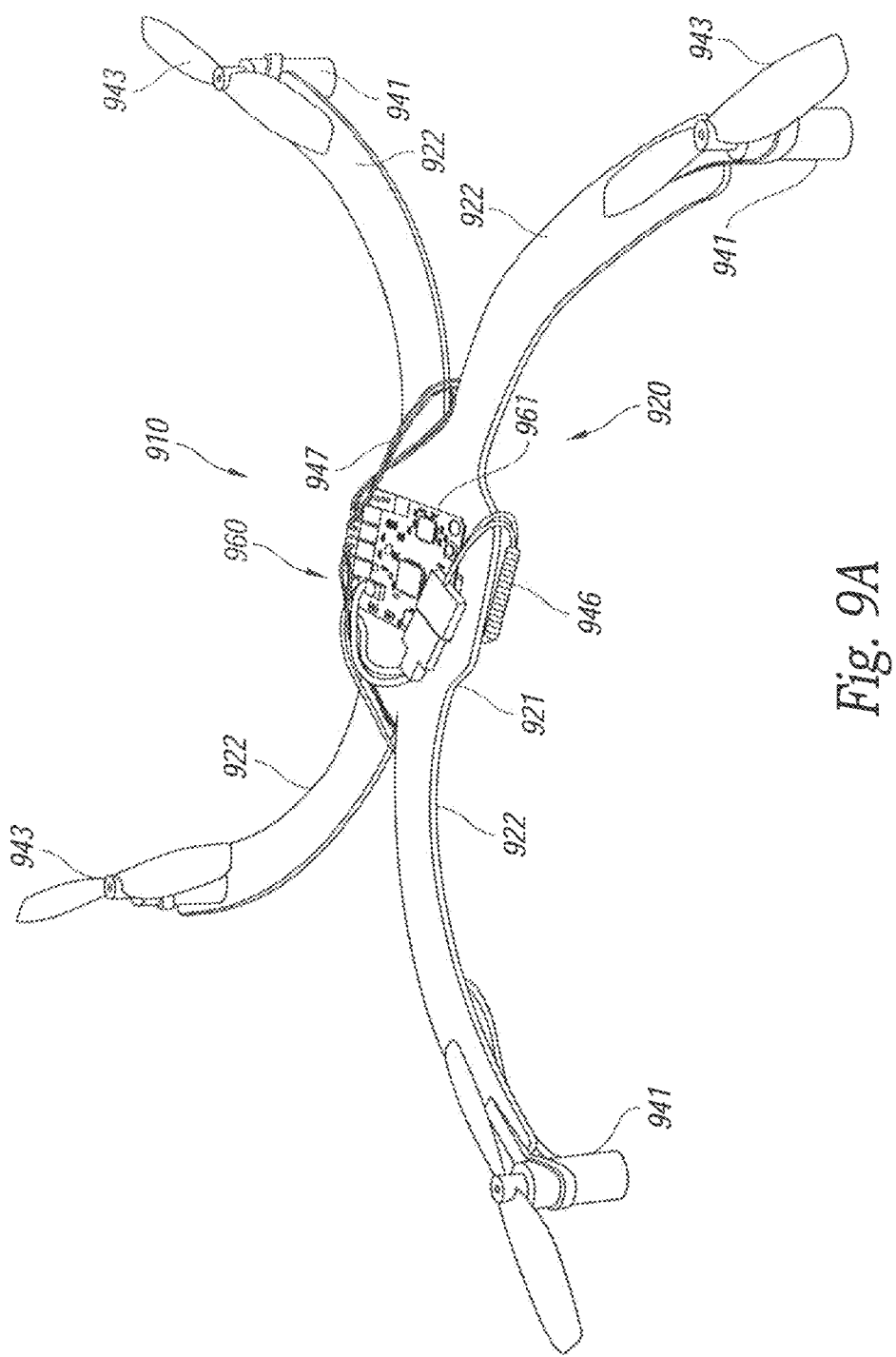
FIGS. 9A-9C illustrate a prototypical UAV configured in accordance with an embodiment of the present technology, with FIG. 9A illustrating an isometric view of the UAV, FIG. 9B illustrating an isometric view of the UAV worn by a user, and FIG. 9C illustrating an enlarged view of a portion of the UAV.
Figure 9B:
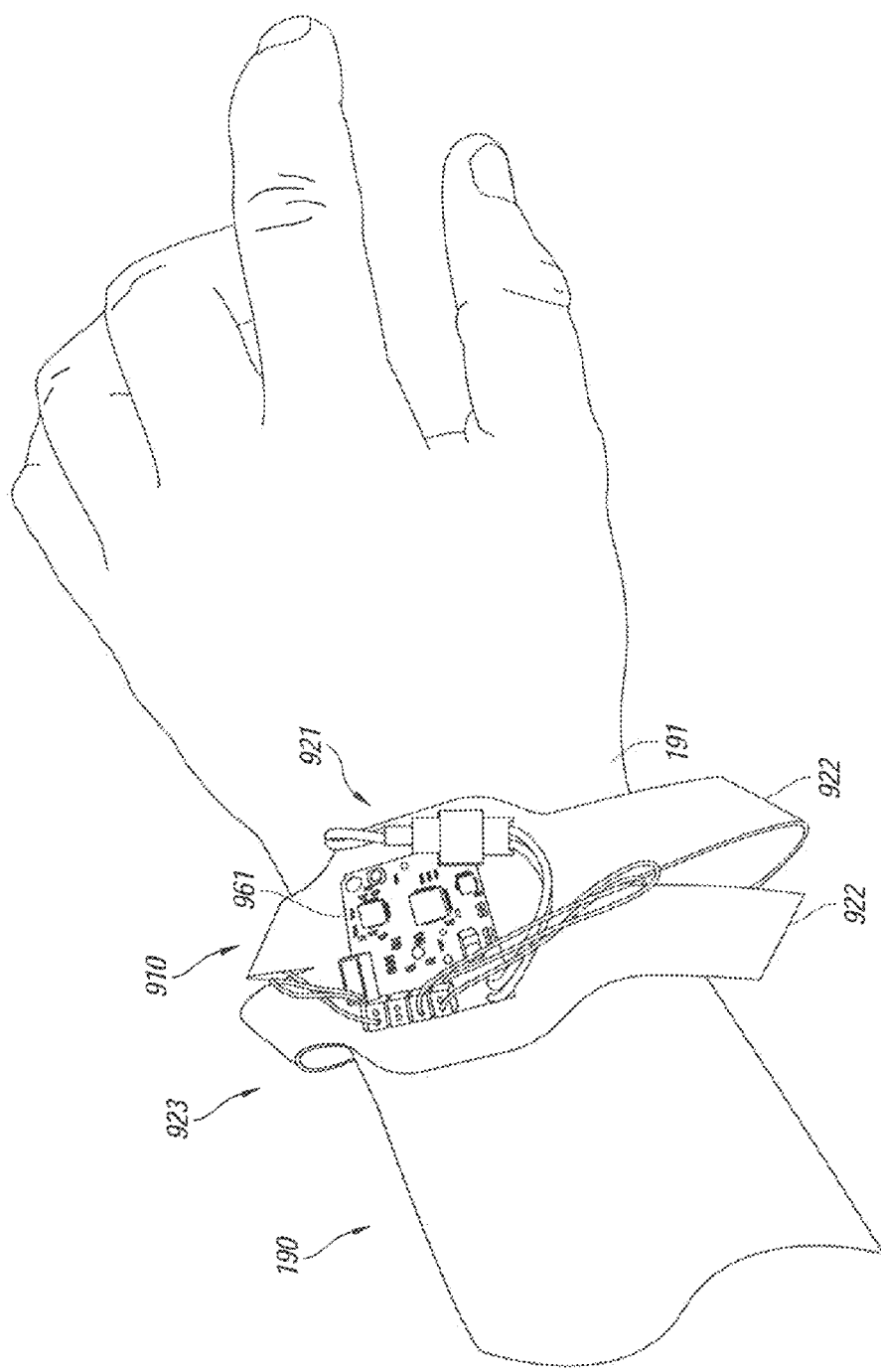
Figure 9C:
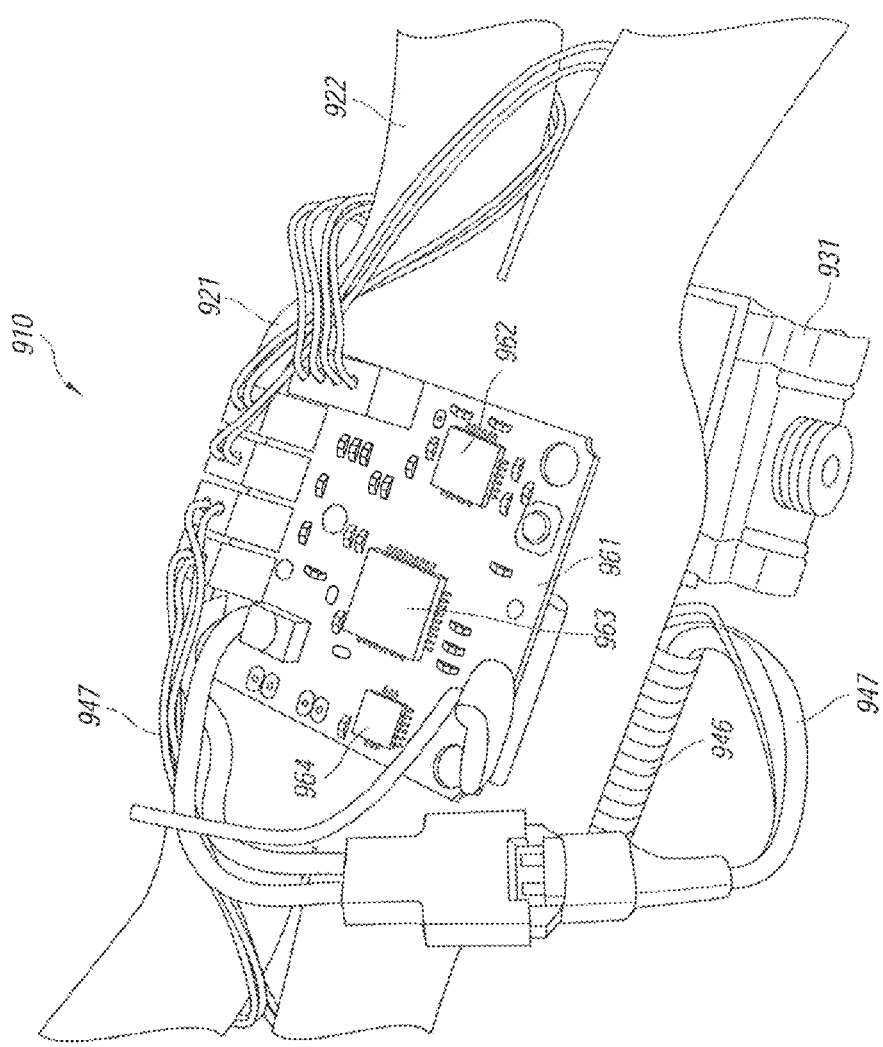

FIGS. 9A-9C illustrate a prototypical UAV 910 configured in accordance with a particular embodiment of the present technology. The UAV 910 includes a support 920 formed from fiberglass. In this embodiment, the support 920 is monolithic and includes a central portion 921 and four integrally formed boom portions 922. Corresponding motors 941 and propellers 943 are carried by (e.g., mounted at the ends of) each boom 922. A controller 960 mounted on a circuit board 961 is carried at the central portion 921 and includes wiring 947 coupled to the motors 941 and a power source 946.

FIG. 9B illustrates the UAV 910 in its wearable configuration, with the boom portions 922 wrapped about the user's wrist 191 to form a wristband 923.

FIG. 9C is an enlarged, isometric illustration of the central portion 921 of the UAV 910, illustrating the controller 160 and wiring 947. The central portion 921 also carries a corresponding camera 931 and the power source 946. Representative circuit elements include a radio receiver 962, microcontroller 963 and inertial measurement unit (IMU) 968.

Figure 10E:
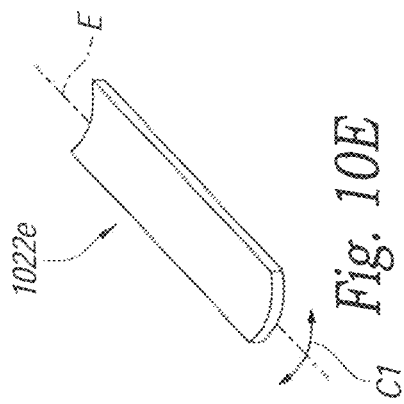
FIGS. 10A-10J illustrate configurable boom portions in accordance with embodiments of the present technology, with a first embodiment shown in a straight configuration (FIG. 10A) and a bent configuration (FIG. 10B); a second embodiment shown in a straight configuration (FIG. 10C) and a bent configuration (FIG. 10D); a third embodiment shown in a straight configuration (FIG. 10E) and a bent configuration (FIG. 10F); and a fourth embodiment shown in a straight configuration (FIG. 10G), a downwardly bent configuration (FIG. 10H) and an upwardly bent configuration (FIG. 10I), and a representative UAV having boom portions with a bi-stable configuration (FIG. 10J).
Figure 10F:
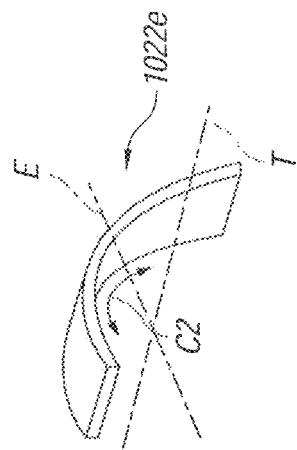
Figure 10C:
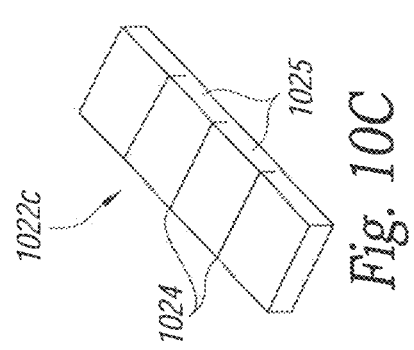
Figure 10D:
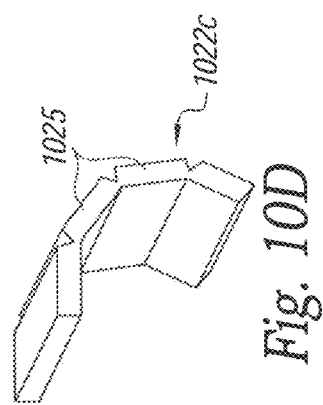
Figure 10A:
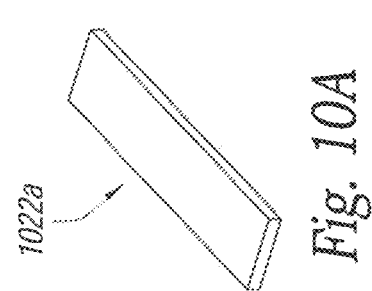
Figure 10B:
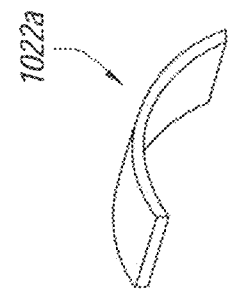

FIGS. 10A-10F illustrate boom portions (or parts of the boom portions) configured in accordance with several representative embodiments of the present technology. Referring first to FIG. 10A, a representative boom portion 1022a can include a bendable plastic and/or fiberglass material, and can accordingly change configuration from the generally straight shape shown in FIG. 10A, to a bent shape shown in FIG. 10B. In particular embodiments, the boom portion 1022a can include an internal flexible, resilient member (e.g. a strip of metal) that allows the boom portion to maintain the shape in which the user places it. The boom portion 1022a can be biased to the generally straight shape, and latched or otherwise releasably secured in the bent shape using magnets, latches or other suitable devices, as discussed above with reference to FIGS. 3-5.

FIG. 10C illustrates another boom portion 1022c that includes one or more slots 1024 extending transverse to an elongation axis E of the boom portion 1022c. The slots 1024 allow the user to bend the boom portion 1022c from the straight, flat configuration shown in FIG. 10C to the curved, wearable configuration shown in FIG. 10D. In a particular aspect of this embodiment, the slots 1024 can be sized and positioned so that, in addition to facilitating the user bending the boom portion as shown in FIG. 10D, they can facilitate the user consistently returning the boom portion 1022c to the straight, flyable configuration shown in FIG. 10C. For example, the slots 1024 can be narrow so as to prevent the boom portion 1022c from being overly bent in an upward direction (e.g. into a "U"-shape) which may not be suitable for flight. In addition, once the slots 1024 have closed (as the boom portion 1022c is bent from the configuration shown in FIG. 10D to the configuration shown in FIG. 10C), the resistance provided by adjacent segments 1025 of the boom portion 1022c coming into contact with each other can provide tactile feedback indicating to the user that the boom portion 1022c is in its proper flyable configuration.

FIG. 10E illustrates still another boom portion 1022e having a bi-stable spring-type configuration, at least generally similar to that used for snap band products (e.g., metal tape measures and wrist bands). Accordingly, the boom portion 1022e can be elongated along an elongation axis E and, in the flyable configuration shown in FIG. 10E, can be at least slightly curved about the elongation axis E, as indicated by arrow C1. This shape resists (but still allows) the boom 1022e to be bent around a transverse axis T, as indicated in FIG. 10F. In the wearable configuration shown in FIG. 10F, the boom portion 1022e is curved about the transverse axis T, as indicated by arrow C2. Accordingly, the boom portion 1022e can be readily "snapped" between the flyable configuration shown in FIG. 10E and the wearable configuration shown in FIG. 10F. A representative installation includes four independently "snappable" boom portions 1022e attached to a common central portion.

Figure 10G:
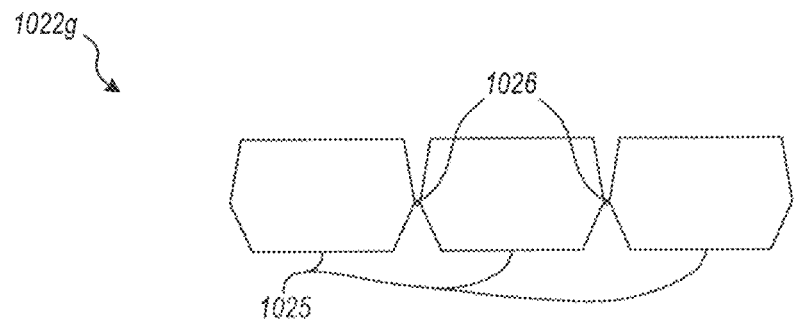
Figure 10H:
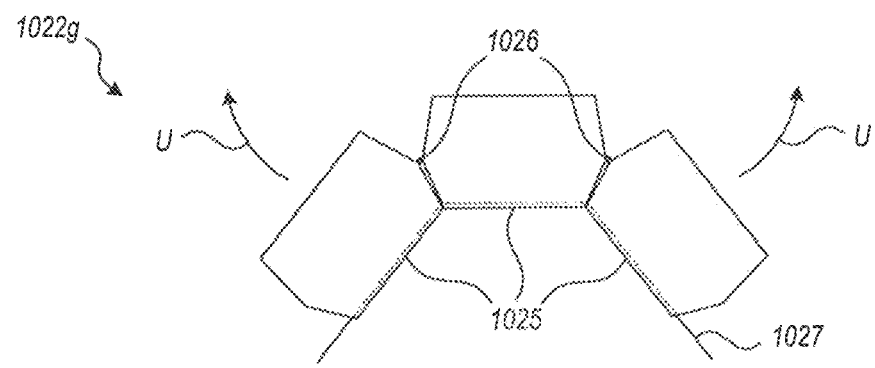
Figure 10I:
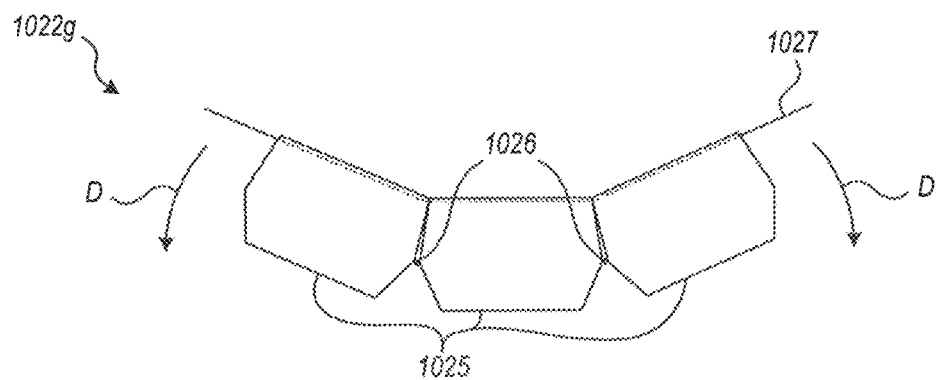

FIGS. 10G-10I illustrate yet another boom portion 1022g having a bi-stable configuration in accordance with another embodiment of the present technology. In one aspect of this embodiment, the boom portion 1022g includes multiple segments 1025 joined via corresponding hinges 1026. The hinges can be live hinges (e.g., formed from the same material as, and integrally with, the segments 1025) or initially separate hinges that are connected between pairs of segments 1025. In either embodiment, the segments 1025 can additionally be connected with an elastic member 1027 (e.g., a rubber band) as shown in FIG. 10H. The elastic member 1027 will bias the boom portion 1022g to the shape shown in FIG. 10H, until an upward force (indicated by arrows U) is applied to the downwardly bowed boom portion 1022g. In response to the upward force, the boom portion 1022g will snap upwardly so as to be bowed in the opposite direction. This motion will result whether the elastic member 1027 is positioned below the hinges 1026, as shown in FIG. 10H, or above the hinges 1026, as shown in FIG. 10I. In the configuration shown in FIG. 10I, a user can apply a downward force, indicated by arrows D, to snap the boom portion 1022g, initially an upwardly bowed shape, to a downwardly bowed shape. In either embodiment, the lower sidewalls at the segments 1025 can have a greater chamfer angle than the upper sidewalls to allow the boom portion 1022g to curve more when downwardly bowed to fit around the user's wrist.

In still further embodiments, the boom portion can have other bi-stable configurations, for example, generally similar to those used for snap hair clips.

Figure 10J:
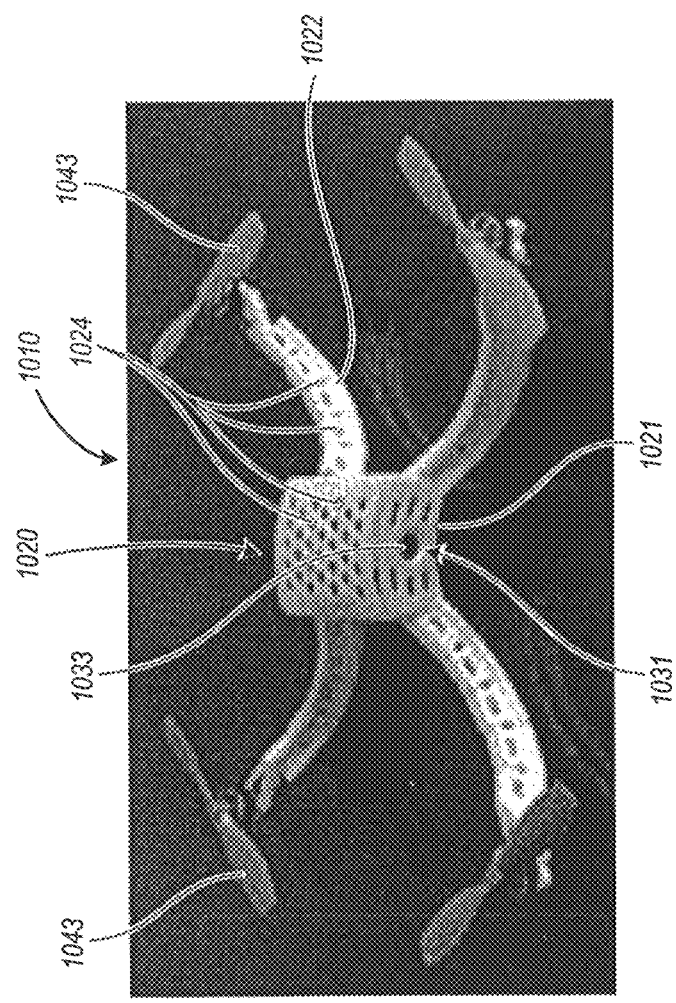

FIG. 10J illustrates a representative UAV 1010 having boom portions 1022 with a bi-stable configuration generally similar to that discussed above with reference to FIGS. 10G-10I. The boom portions 1022 have an upwardly bowed configuration for flight, as shown in FIG. 10J, and can be snapped downwardly to form a wristband when worn. The boom portions 1022, together with a corresponding central portion 1021, form an overall support structure 1020. The central portion 1021 can house a corresponding camera 1031 behind an aperture 1033. The support structure 1020 can include lightening holes 1024 in the central portion 1021 and/or the boom portions 1022 to reduce the weight of the UAV 1010. In a particular embodiment shown in FIG. 10J, the boom portions 1022 can extend far enough from the central portion 1021 to allow a user to easily catch the UAV 1010 by grasping the central portion 1021 and avoiding the propellers 1043 at the ends of the boom portions 1022.

Figure 11:
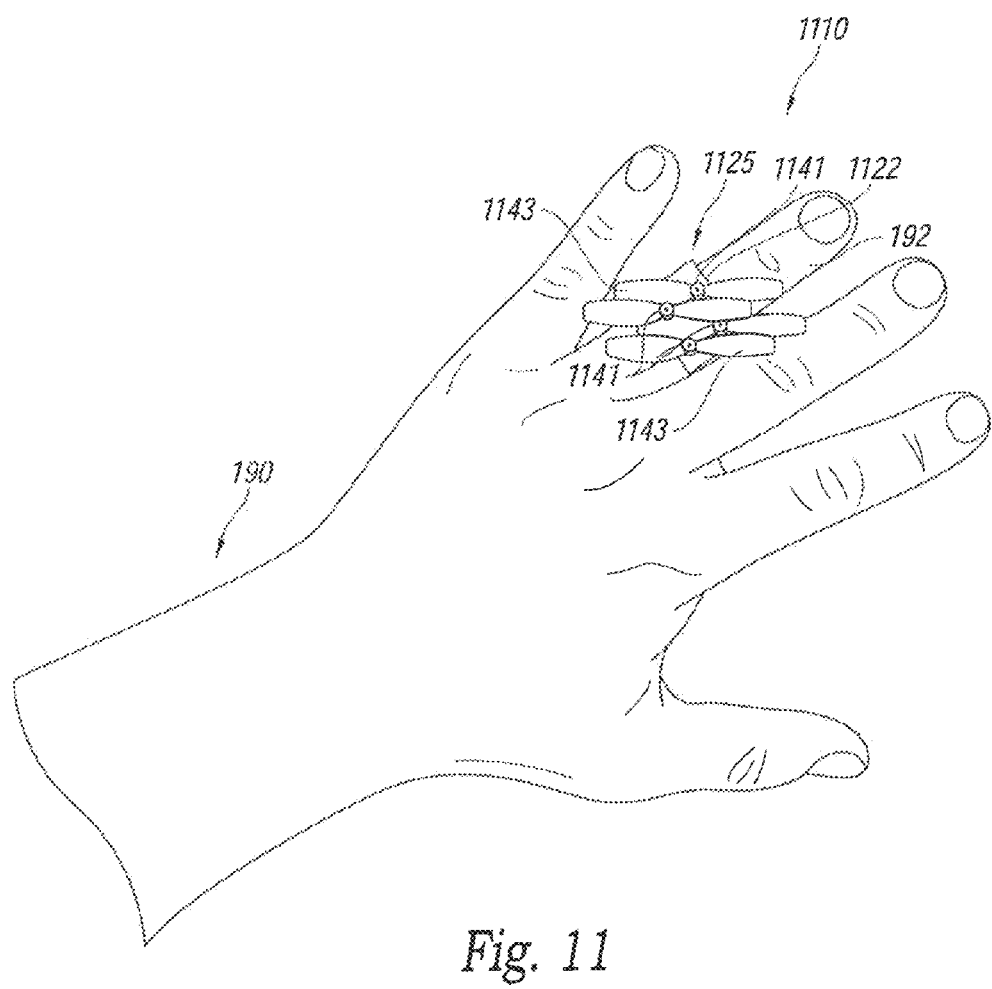
FIG. 11 is a partially schematic illustration of a UAV having a wearable configuration in the form of a ring, in accordance with an embodiment of the present technology.

FIG. 11 is a partially schematic illustration of a UAV 1110 configured to be worn like a ring in accordance with another aspect of the present technology. In particular, the UAV 1110 can include multiple boom portions 1122, each of which supports a corresponding motor 1141 and propeller 1143. In the wearable state, the boom portions 1122 curve in generally the same manner described above with reference to FIGS. 3-10F to assume the shape of a ring band 1125 that is worn on the users finger 192. Accordingly, the overall arrangement described above with reference to the wrist-worn UAV 110 can be applied, in a scaled-down manner, to be worn on the user's finger 192.

Figure 12:
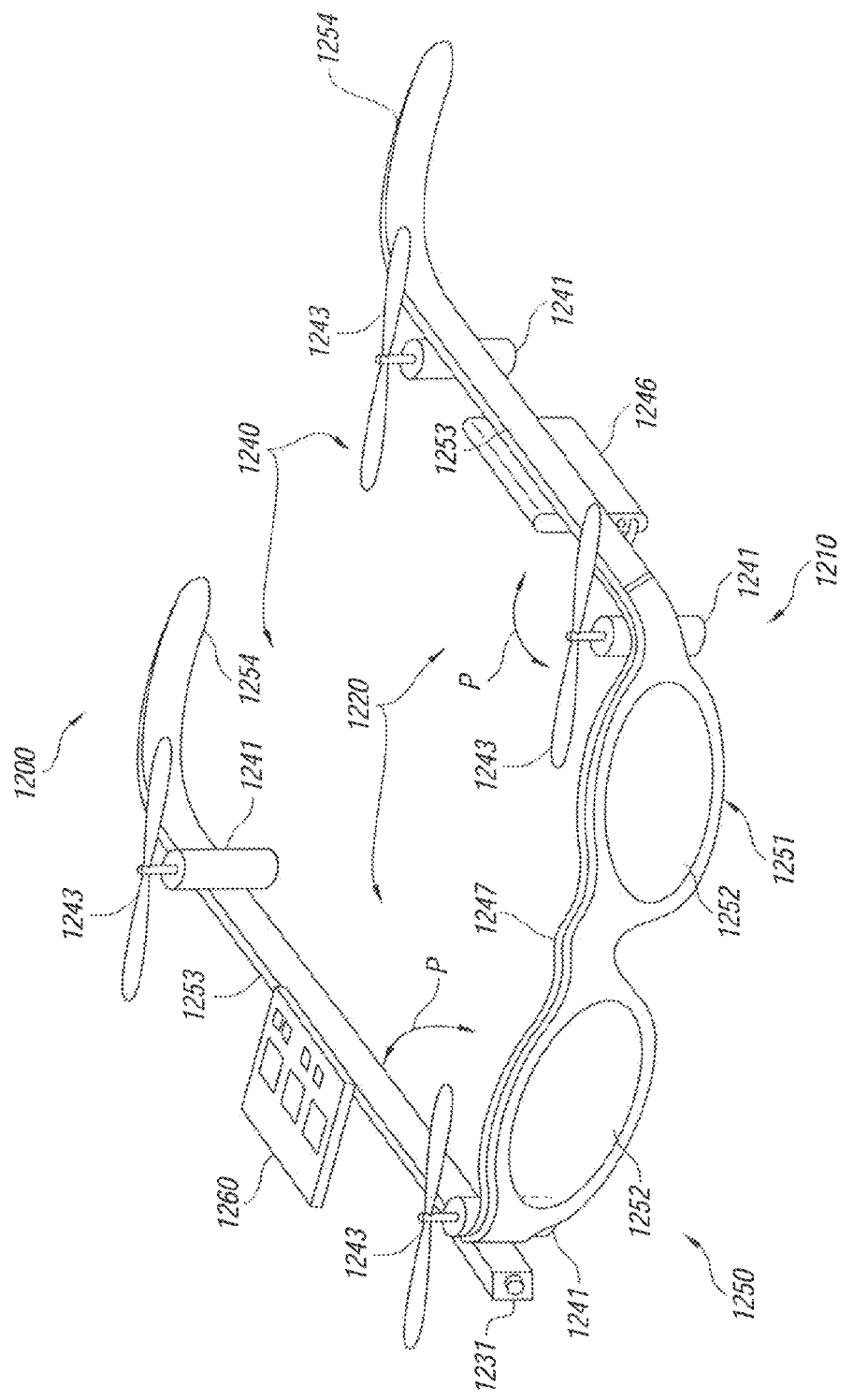
FIG. 12 is a partially schematic illustration of a UAV having a wearable eyeglass configuration in accordance with an embodiment of the present technology.

FIG. 12 illustrates another system 1200 having a UAV 1210 configured as a pair of eyeglasses 1250. For example, the UAV 1210 can include a lightweight, durable support 1220 that in turn includes a rim 1251. The rim 1251 carries lenses 1252 (e.g., plastic lenses), and two temple pieces or arms 1253 that are pivotably mounted to the rim 1251. The rim 1251 can rest on the user's nose, and each temple piece 1253 can include a corresponding earpiece 1254 engaged with the user's ears so that the UAV 1210 can be worn, and can function, as a conventional pair of eyeglasses 1250. The temple pieces 1253 can rotate or fold inwardly and outwardly as indicated by arrows P. In addition, the UAV 1210 includes a propulsion system 1240 that in turn includes multiple (e.g., four) motors 1241, each of which drives a corresponding propeller 1243. A power source 1246 (e.g., battery) can be carried by one temple piece 1253, and other system components (e.g., a flight controller 1260), can be carried by the other temple piece 1253 to balance the UAV 1210. For example, the components can be arranged to place the UAV center of gravity in the center of the rectangle formed by the four motors 1241. Wiring 1247 can be routed along the rim 1251 and temple pieces 1253 to provide power and signals, and can be routed through or close to the hinges between the rim 1251 and the temple pieces 1253 to reduce or eliminate binding or stretching. As discussed above with reference to the UAV 110, the UAV 1210 shown in FIG. 12A can include a camera 1231 or other payload.

Figure 13A:
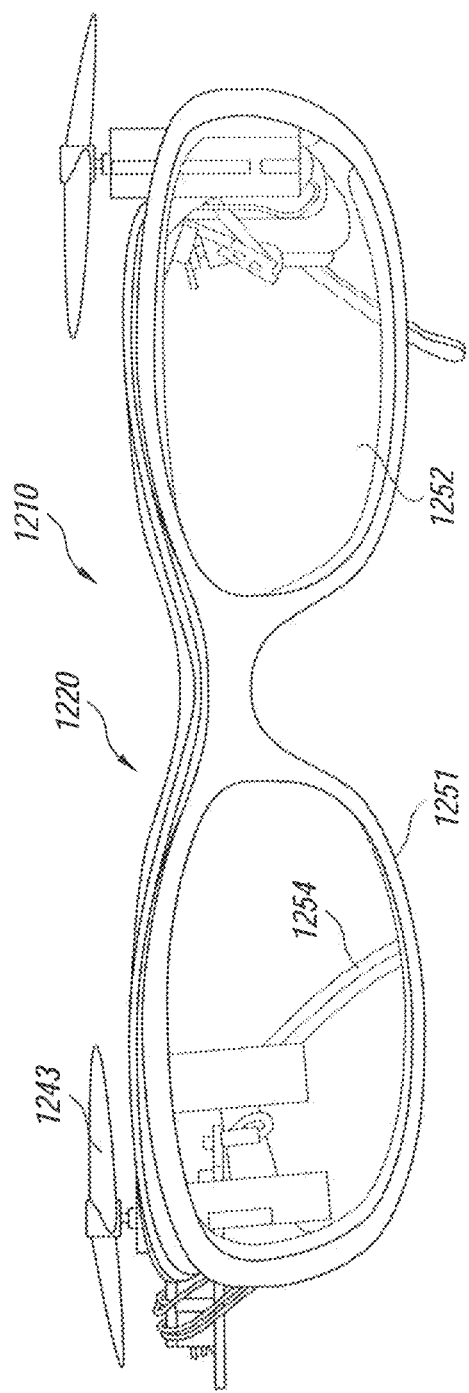
FIGS. 13A-13C are partially schematic illustrations of a UAV having a wearable configuration in the form of a pair of eyeglasses, in accordance with another embodiment of the present technology, with the UAV shown from the front (FIG. 13A), the top (FIG. 13B) and in a folded configuration (FIG. 13C).
Figure 13B:
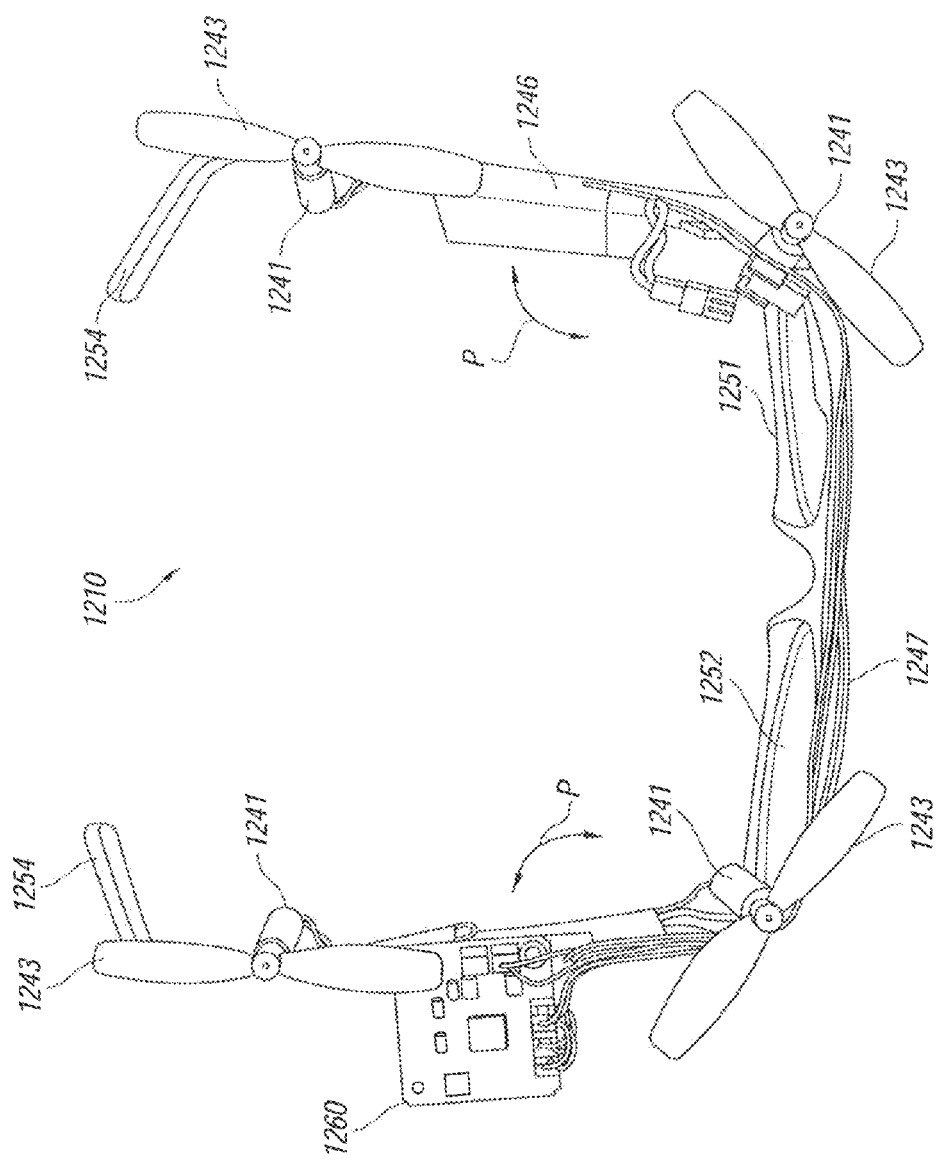
Figure 13C:
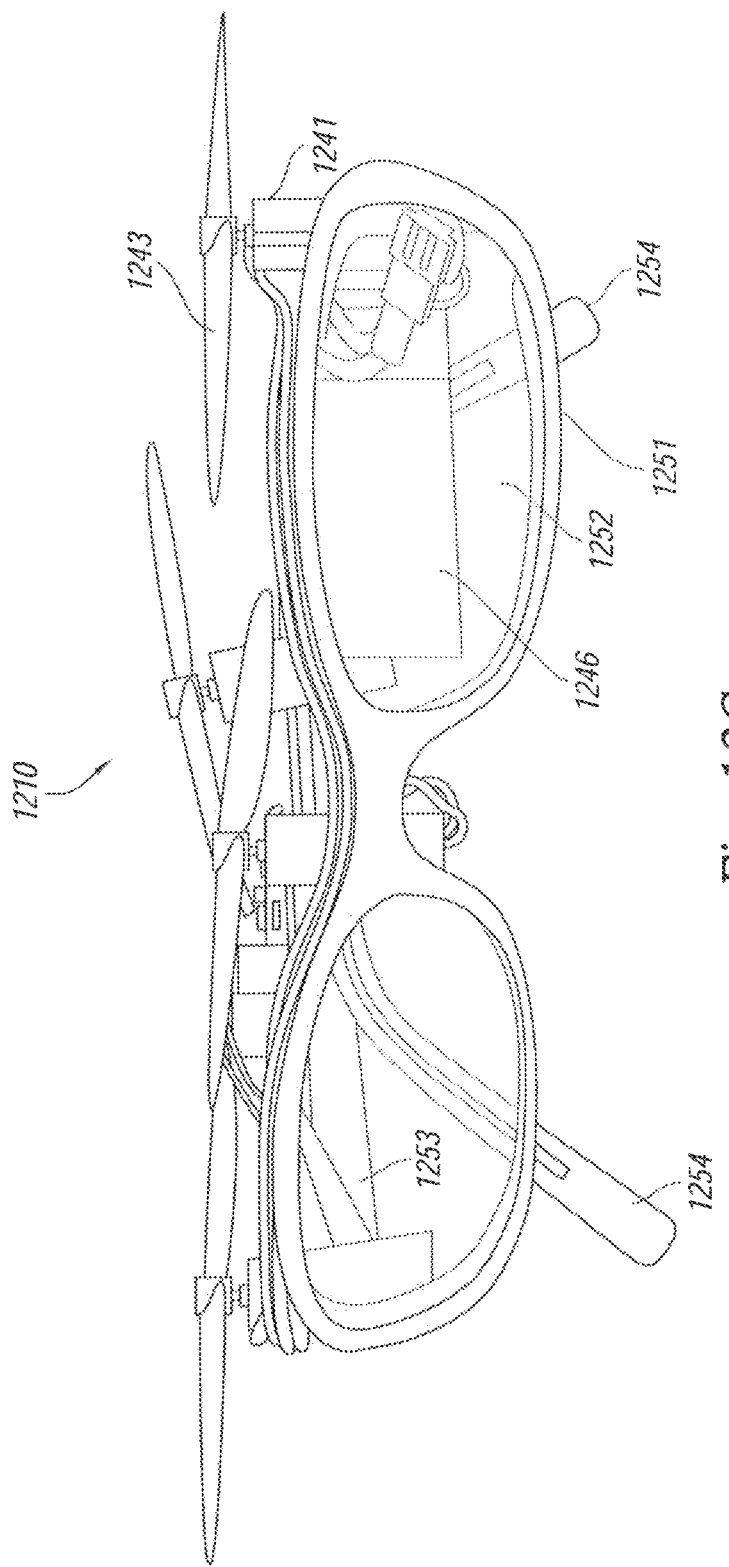

FIG. 13A is a front view of a prototypical embodiment of the UAV 1210. FIG. 13B is a top-down view of the UAV 1210 shown in FIG. 13A. The temple pieces 1253 can pivot back and forth between a folded and a deployed configuration as shown by arrows P, in the manner of a conventional pair of eye glasses. FIG. 13C illustrates the UAV 1220 with the temple pieces 1253 in the folded configuration.

One feature of several embodiments discussed above is that the UAVs can both perform a UAV mission (e.g., take photographs and/or videos) and be worn by the user when not deployed. An advantage of this feature is that the UAV is easier to transport and easier to quickly deploy and stow.

Another advantage of the foregoing features is that the UAV can be small enough, compact enough, and maneuverable enough to take pictures and/or videos of the user and/or other subjects in a wide variety of contexts and/or while the user or subject conducts a wide variety of actions. Such action shots and video are well beyond the capability of a typical "selfie" taken at arms' length or at the end of a pole. Still further, the UAV can follow the user as the user conducts such activities, providing yet another degree of realism and perspective for the images the UAV takes.

2.0 Representative Control Arrangements

Each of the UAVs described above can be configured (e.g., programmed) to carry out a variety of tasks. The overall UAV systems described herein can include computers or computer systems in addition to the on-board controllers described above. Such off-board computers can provide additional functions, and can communicate with the UAV without adding weight to the UAV. For example, such systems can be used to create "canned" operation programs that are downloaded to the UAV for execution. Such systems can also receive and/or process visual images, among other tasks.

Figure 14A:
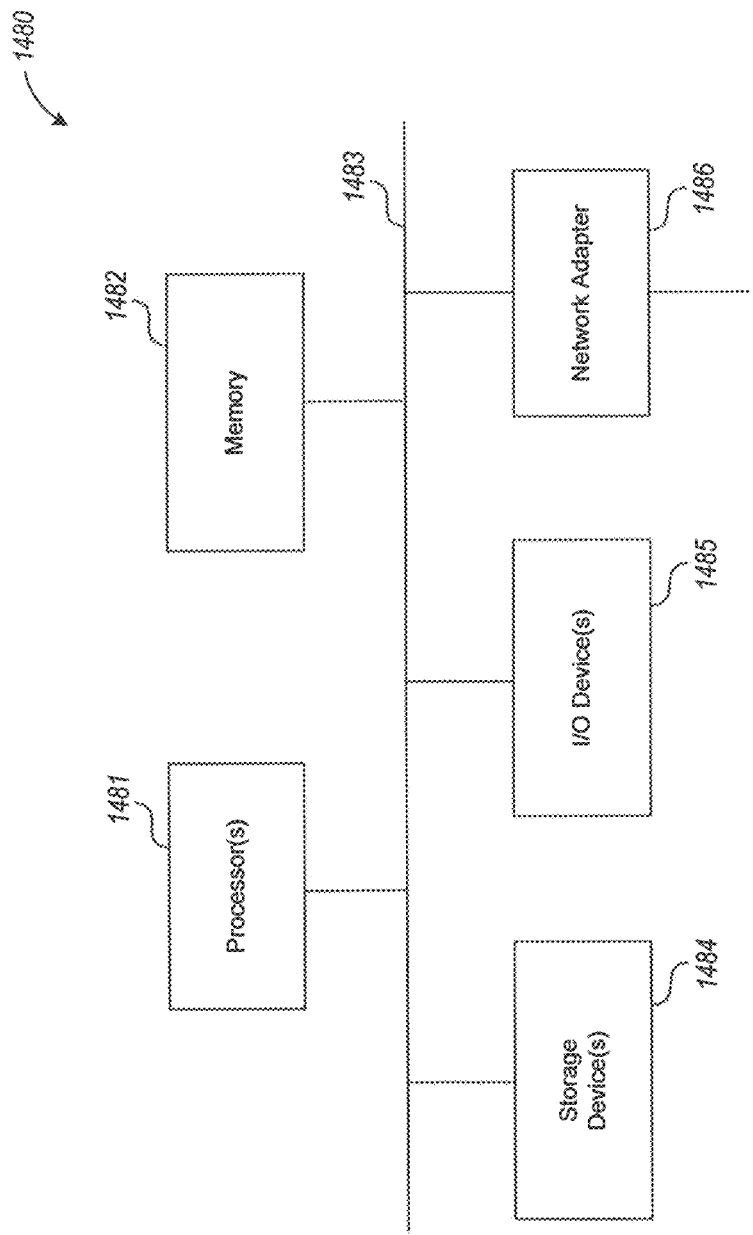
FIG. 14A illustrates a computer system suitable for supporting UAV operations in accordance with embodiments of the present technology.

FIG. 14A is a block diagram of a computing system 1480 that can be used to implement features, e.g., navigation, object recognition, preprogrammed behavior and/or real time intelligent behavior, of at least some of the foregoing embodiments. The computing system 1480 can include one or more central processing units ("processors") 1481, at least one memory 1482, input/output devices 1485 (e.g., keyboard and/or pointing devices, and/or display devices), storage devices 1484 (e.g., disk drives), and network adapters 1486 (e.g., network interfaces) that are connected to an interconnect 1483. The interconnect 1483 is illustrated schematically and can include any one or more separate physical buses, point-to-point connections, or both, connected by appropriate bridges, adapters, or controllers. The interconnect 1483, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1482 and storage devices 1484 are computer-readable storage media that can store instructions that implement at least some portions of the actions described herein. In addition, the data structures and message structures can be stored or transmitted via a data transmission medium, e.g., a signal on a communications link. Various communications links can be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1482 can be implemented as software and/or firmware to program the processor(s) 1481 to carry out actions described herein. In some embodiments, such software or firmware can be initially provided to the processing system 1480 by downloading it from a remote system to the computing system 1480 (e.g., via network adapter 1486).

The various embodiments described herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry can be in the form of, for example, one or more ASICs, PLDs, FPGAs, etc.

Figure 14B:
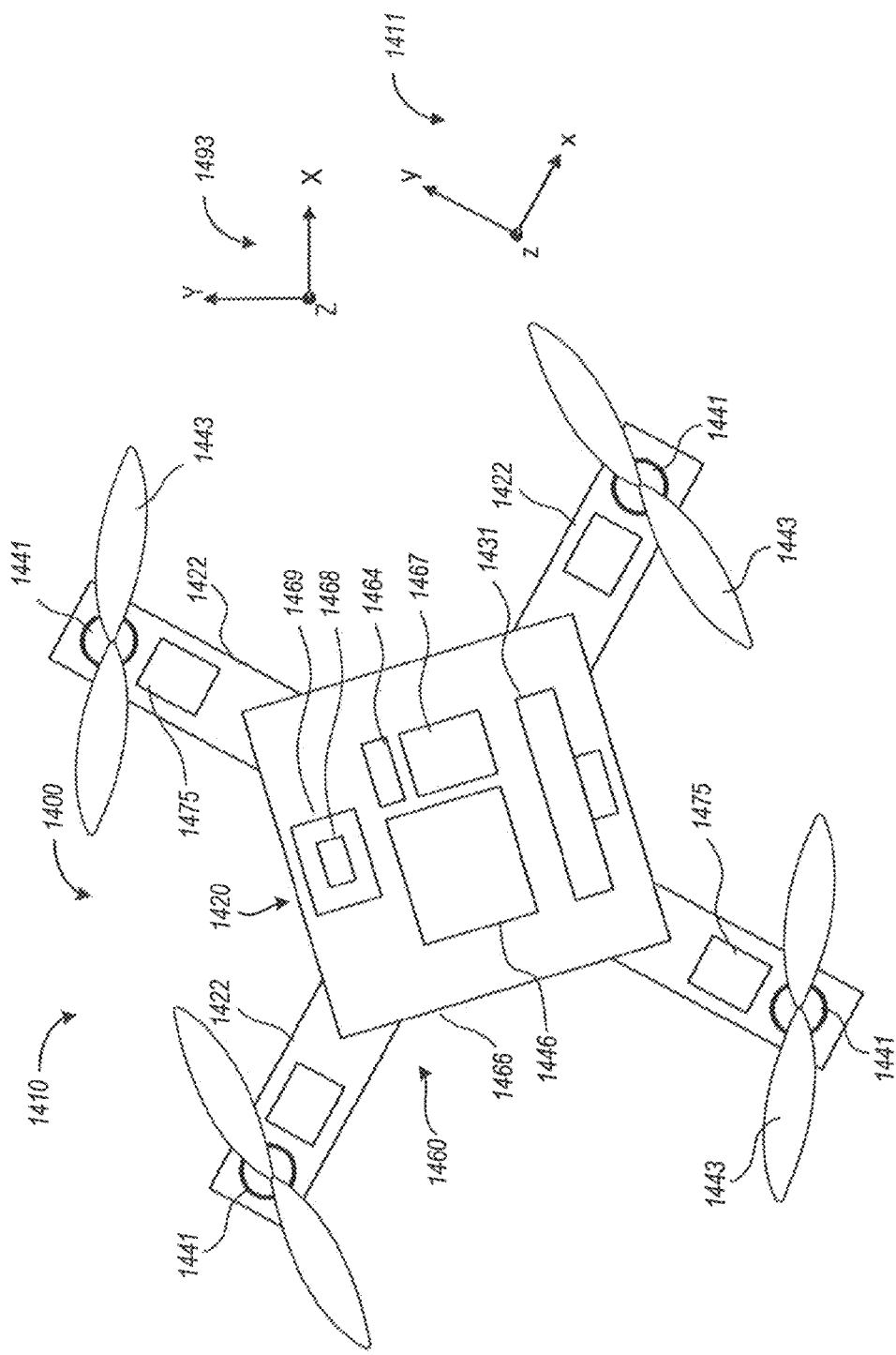
FIG. 14B illustrates a representative UAV in a UAV frame of reference in accordance with an embodiment of the present technology.

FIG. 14B is a partially schematic illustration of an overall system 1400 that includes a UAV 1410. In a particular aspect of this embodiment, the UAV 1410 can have a quad-rotor configuration, with a support 1420 having four boom portions 1422, each supporting a corresponding motor 1441 and propeller 1443. The motors 1441 can be brushless motors with a 13 mm diameter, and the propellers can have a 75 mm diameter, in a particular embodiment. In other embodiments, the UAV 1410 can have any of the other configurations described herein. A support 1420 carries a corresponding controller 1460 (e.g., an Intel Edison controller or a Tangier-Merrifield platform), which can in turn include a housing 1466. In an embodiment shown in FIG. 14B, the housing 1466 carries a corresponding battery 1446 (e.g., a one-cell, 350 mAh lithium polymer battery) and a camera 1431 (e.g., a USB webcam or state of the art cell phone camera module with or without an optical image stabilizer). The housing 1466 can also carry a control unit 1467, a sensor 1464 (e.g. an MS5611 pressure sensor available from Amsys of Mainz, Germany) for altitude control, and an inertial measurement unit (IMU) 1468 (e.g., an MPU9250 unit available from Invensense of San Jose, Calif.), which includes an accelerometer. The IMU 1468 (a specific type of sensor) can in turn be secured to a vibration isolation mount 1469 that includes a suitable vibration isolating material, for example, Moongel®. Other equipment that may be sensitive to vibrations (e.g., the camera 1431) can also be mounted on the same or a different isolation mount 1469. The IMU 1468 senses accelerations and rotations along and about the x, y and z axis in a UAV frame of reference 1411. The user has a corresponding user's frame of reference 1493, which can be aligned or partially aligned with the UAV frame of reference 1411 in preparation for a flight. For example, the X axis of the users frame of reference 1493 can be aligned with the x axis of the UAV frame of reference 1411 aligned prior to flight. In a particular embodiment, the controller unit 1467 stores acceleration and velocity values at a suitably high frequency (e.g. about 100 Hz) and stores the values for a period of time (e.g. 10 seconds). The velocity, acceleration (and/or other) information can then be used to control the motors 1441 via corresponding electronic speed controllers 1475. In a particular embodiment, the electronic speed controllers 1475 can be located on the boom portions 1422, as shown schematically in FIG. 14B.

Particular embodiments described below represent methods for pre-programming the trajectory of the UAV. A representative method includes launching the UAV by hand, while the motion of the launch is measured. The measurements, e.g., the parameters of this motion, can be used to pre-program the trajectory. For example, the direction of the launch can be used to set the direction of a linear trajectory, and the acceleration during the launch (resulting in a launch velocity at and shortly after launch) can be used to set the length of the trajectory. Setting direction and length of a linear trajectory allows the user to control the return point of the UAV in three dimensions in some embodiments. A simplified version of this algorithm can constrain the height of the UAV via altitude stabilization. This version can allow a user to control the direction and length of the linear trajectory in a two-dimensional plane perpendicular to gravity.

One feature of the techniques described herein is that they can be faster and more intuitive to the user. In addition, embodiments of the techniques do not require additional equipment, nor a manually operated interface (e.g., push buttons) to operate the UAV, e.g., with the exception of an emergency shut off switch which is readily accessible to the user. In other embodiments, the user can optionally operate the UAV in a more conventional manner.

FIGS. 15A-15G illustrate the user 190 operating the UAV 1410 in accordance with a particular embodiment of the present technology. Beginning with FIG. 15A, in a first (e.g., "idle") phase 1595a, the user 190 carries the UAV 1410 (after having worn it) in preparation for launch. In FIG. 15B, during a second, e.g., "throw" phase 1595b, the user throws the UAV 1410 as indicated by arrow E1. In a particular embodiment, the user can incorporate, in the throwing gesture, information regarding the desired pose, orientation and/or maneuver to be undertaken by the UAV once it reaches its target location. For example, if the user throws the UAV with the camera pointing toward the user, the UAV can re-assume this orientation when it reaches the target location. In particular embodiments, the UAV may be programmed with pre-set orientations or poses, and can interpolate, based on the input received from the user as the user throws the UAV, to determine a final pose.

After the user has released the UAV 1410 during the course of the throw, the UAV 1410 can begin a third, e.g., "freefall" phase 1595c (FIG. 15C), as indicated by arrow E2, under the influence of gravity. During a fourth, e.g., "deceleration" phase 1595d shown in FIG. 15D, the propulsion system of the UAV 1410 operates to counter the freefall acceleration, as indicated by arrow E3. In FIG. 15E, the UAV 1410 engages in a payload-specific fifth (e.g., "mission") phase 1595e. For example, when the UAV 1410 includes a camera, the fifth phase 1595e can include taking a picture of the user 190 or other target. The UAV 1410 can automatically orient the camera toward the user 190, or the user can direct the UAV 1410 to assume a different, e.g., mission specific, orientation. Accordingly, the UAV 1410 can include machine-vision functions to provide object recognition. Machine vision can also be used for navigation, tagging, and/or other tasks. The UAV can also execute other pre-defined maneuvers, e.g., circling the user or following the user, both of which maneuvers can be performed while the camera is trained on the user or other target.

In FIG. 15F, the UAV 1410 operates in a sixth (e.g., "return") phase 1595f, in which it begins flying back toward the user 190, as indicated by arrow E4, or lands on the ground, or undergoes another suitable (e.g., end-of-mission) maneuver. In FIG. 15G, the user 190 catches the UAV 1410 during a seventh (e.g., "catch") phase 1595g of the operation.

In one aspect of the foregoing embodiment, the gesture-based technique for identifying, and guiding the UAV 1410 to its target location is the only technique used to control the UAV. In other embodiments, the UAV 1410 can include an optional manual operating function (e.g., via a joy stick and/or other controller) and/or a manual override function (e.g., to take over control after an errant throw), and/or voice control techniques (received via a microphone) and/or hand gestures (e.g., sign language received via the on-board camera). In still further embodiments, the UAV 1410 can fly to pre-programmed way points or other locations.

Figure 16:
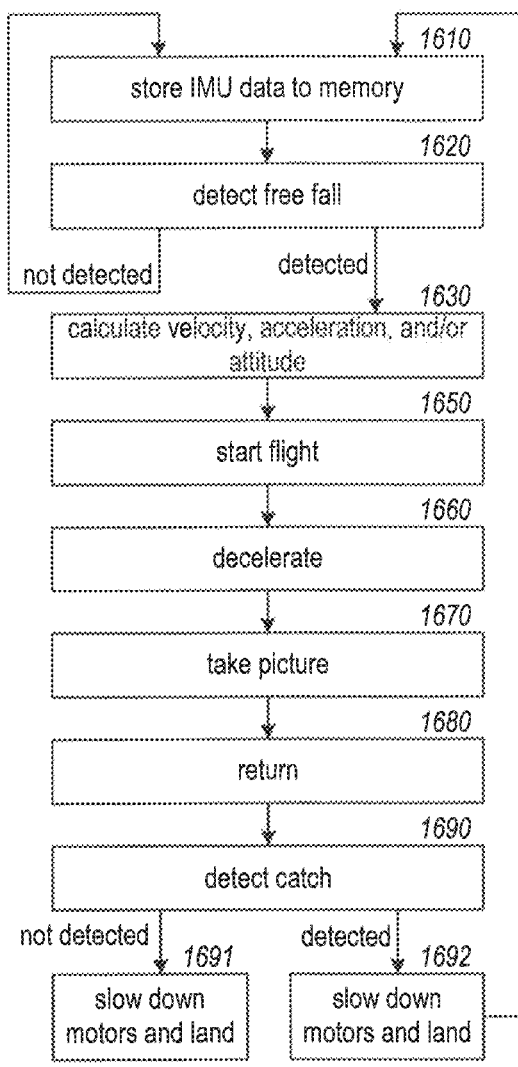
FIG. 16 is a flow diagram illustrating representative steps for operating a UAV in accordance with an embodiment of the present technology.

FIG. 16 is a flow diagram illustrating aspects of the operation described above with reference to FIG. 15. In an "idle" phase, mode, or step 1610, the UAV controller can store the IMU data and run a routine to detect a freefall event 1620. "Freefall" as used herein can refer to a state when no other forces other than friction with the air and/or gravity act on the UAV—thus, throwing the UAV up in the air can be considered "freefall" and freefall is not limited to the UAV "falling down". "Freefall" detection as used herein can include detection of a launch event, which does not result from falling, but rather from a forceful release from the user's hand.

To detect freefall, for example, the routine can receive and track inputs from the IMU 1468 (FIG. 14B), and check the values against a threshold condition. For example, when the routine determines that all acceleration values from the last 0.05 seconds are below 0.1 times the earth's acceleration, i.e. all acceleration values are below 1 m/sec$^2$, this can correspond to a freefall event. If freefall is not detected, the controller can repeat steps 1610 and 1620. If freefall is detected, the controller can calculate the velocity and attitude of the motion of the UAV relative to the user's frame of reference 1493 (FIG. 14B).

The routine executed by the controller can be programmed to "assume" the release of the UAV to have happened in a particular time window before the freefall detection event (e.g., from 1-0.05 seconds prior to freefall). In other embodiments the release can be explicitly identified. By integrating the acceleration over the time window, the routine can determine the velocity vector v1 of the UAV (block 1630). The motors of the UAV can be turned on and it can be stabilized to zero acceleration along the X- and the Y-axis, to hold the position along the Z-axis (e.g., "altitude-hold mode.") The axes in this example are relative to the user reference frame, which can be stationary or moving depending upon the embodiment. The flight controller can use the input of an air pressure sensor to help stabilize the UAV's altitude in combination with providing inertial navigation along the Z axis.

At block 1650, the UAV starts its flight. The start flight event can take about 0.8 seconds in particular embodiments. Following the start flight event, the UAV can be decelerated to zero velocity in the user's reference frame by accelerating with constant acceleration a1 along the X- and Y-direction for time t1 given by, e.g., v1=a1*t1 (block 1660). The absolute value of the constant acceleration a1 can be set in advance, e.g., to about 2 m/sec$^2$ in some embodiments, e.g., with or without a smooth acceleration ramp. Now the UAV can be at rest in the user's frame and can take a picture and/or a video (block 1670). After taking the picture, the UAV can return to the user by accelerating with an acceleration of a1 for time t1 (block 1680). The UAV can now be moving at velocity −v1 toward the user and the user can catch the UAV in mid-air. The UAV can be decelerated before getting close to the user, so as to reduce sudden peaks in acceleration. Any absolute acceleration along, e.g., the X or Y axes higher than, e.g., 5 m/sec$^2$ can be detected as a catch (block 1690). In other embodiments, other sensors can be used in addition to or in lieu of an accelerometer. If no catch is detected, the UAV can decelerate and slow down and perform an automated landing (block 1691). In other embodiments, the UAV can be tethered to the user and the user can pull on the tether to return the UAV to the user or to land the UAV such that it can be readily recovered. If a catch is detected the motors can be switched off, e.g., automatically, (block 1692) and the UAV can be placed back into idle mode (block 1610).

In the foregoing embodiment, the control algorithm determines when and where the UAV stops (i.e., hovers) and turns. The algorithm can use two parameters to make this determination. For example, the direction of the throw can determine the direction of travel for the UAV, and the intensity, e.g., the integrated acceleration, of the throw can determine the distance the UAV travels. The extension of the algorithm to define three parameters can proceed as follows: Instead of controlling the UAV to be at a constant height. The two angles and the absolute value of the throw velocity vector are used to control the turning point of the UAV in three dimensions. This results in full three dimensional control over the turning point of the UAV.

FIGS. 17A-17B illustrate control modes for interpreting a user's motions (e.g., gestures and/or interactions with the UAV) in accordance with some embodiments of the present technology. Some users may be more comfortable indicating flight patterns with their gestures (e.g., by throwing the UAV, as described above with reference to FIG. 15). Other users, however, may not be able to throw the UAV with the accuracy they desire. Accordingly, the disclosed UAVs can operate in one or more modes (which can be selected, e.g., by operating a selector on the UAV) to accommodate different user preferences.

As shown in FIG. 17A, the UAV 1410 can be set in a "complete control mode" by the user 190. In this mode, the throw velocity vector can be used to determine the flight path taken by the UAV. For example, if the user throws the UAV gently in an upward direction, the UAV will travel along a first vector v1 for a first distance D1 to a first target location TL1. The first target location TL1 is determined by the throw velocity (e.g., integrated acceleration) provided by the user's throwing gesture or motion. Signal processing can be performed to identify the first vector v1 at release, as distinguished, e.g., the pre-release rotation of the user's arm. The UAV is then directed along the first vector v1 until it reaches the first target location TL1. Similarly, a very hard throw in the direction of a second vector v2 will cause the UAV to travel a much greater distance (e.g., a second distance D2) corresponding to the magnitude of the throw, to arrive at a second target location TL2. Finally, a throw with intermediate acceleration between the first and second vectors v1, v2 can result in a distance of a third vector v3 to arrive at a third target location TL3. In some embodiments, gestures that would cause the UAV to hit the ground can be recognized by the flight controller as such, and the flight controller can direct the UAV to maintain an offset relative to the earth. The flight controller can also project the launch vector onto a plane above the earth's surface to identify a suitable flight path.

While "complete control mode" can provide experienced users with the ability to exactly place the UAV, some users can find the granularity and/or required accuracy frustrating. As shown in FIG. 17B, the UAV can instead be set in a "constrained input mode" by the user 190. Constrained flight can incorporate one or more surfaces into the flight path and can project the user's commands onto those surfaces. In this example, regardless of the direction of the launch vectors v1, v2, v3, the system can identify a distance, e.g., D1, D2, D3, corresponding to the magnitude or force of the throw, project the launch vector onto a plane, e.g., 7 feet above the earth's surface, or at the launch altitude, and then set a flight path or trajectory (TR1, TR2, TR3) which will bring the UAV to a position on the plane, with the distance corresponding to the magnitude of the force with which the user launched the UAV. The corresponding target locations are identified as TL10, TL20 and TL30, respectively, in FIG. 17B. In another constrained input mode, both the distance and altitude are preset, and the user's throwing motion determines only the direction of the target location. This arrangement can be particularly useful for accurately and repeatedly capturing an image of the user, even if the user is preoccupied with other tasks (e.g., climbing or other sports activities) and does not wish to focus on accurately placing the UAV. In particular embodiments, the user can change among the various control modes (via a mechanical switch or a software interface provided by a smart phone or other device), e.g., by reducing constraints as the user becomes more proficient.

Though depicted in FIG. 17B as a flat plane, the projection surface can have other shapes in other embodiments. For example, the surface can be hemispherical (e.g. located about the user) with the throwing force corresponding to the height in the sphere of the target location), spherical, a conical or cylindrical (e.g., for which the magnitude indicates how quickly and/or how far up the UAV is to circle the user while rising upward along the surface). In other embodiments, representative processes map the user's gesture to the UAVs trajectory and/or location in accordance with other steps.

For embodiments in which the UAV includes a camera, the flight path taken by the UAV can include an adjustment such that the camera faces the point of launch. In other embodiments, the UAV can be controlled in other manners. For example, if the user spins the UAV upon release, the UAV can take the plane corresponding to the spin as the plane upon which it is to project its flight path, or the spin axis can correspond to the axis of a conical or other surface upon which the flight path is to be based, or the motion can signal the UAV to circle around the user after reaching its turning point.

Figure 18:
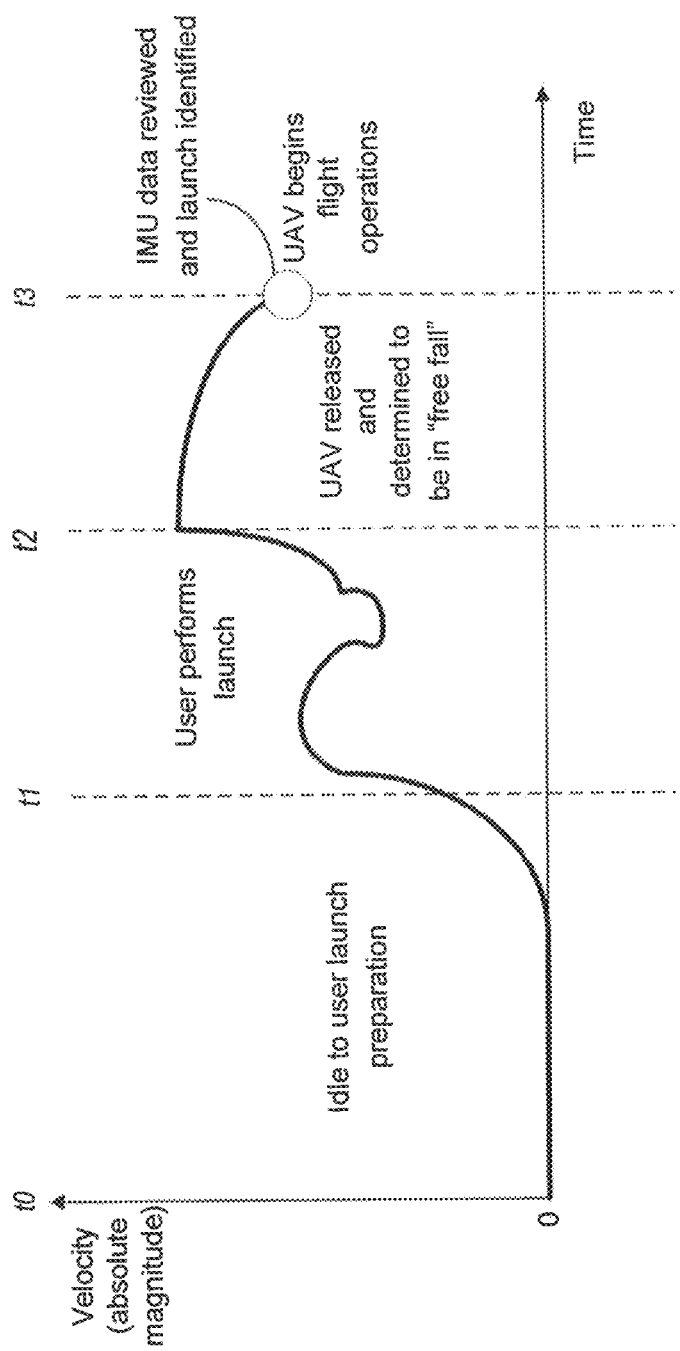
FIG. 18 is a timeline illustrating representative maneuvers conducted by a UAV in accordance with embodiments of the present technology.

In some embodiments, inductance sensors and/or other sensors can be used to determine when the user's hand is no longer touching the UAV device during a release. Alone or in conjunction with such sensors, the UAV can also be controlled based on the time series of previous IMU information. For example, FIG. 18 is a plot of a UAV's velocity over time during a launch in accordance with particular embodiments. Beginning at time t0, the system can be idle (e.g., in the user's bag, worn by the user or on the user's clothing.) During launch (e.g., during a wind up for a throw) between time t1 and t2, a velocity pattern associated with the launch will occur. Following launch at time t2, a "freefall" period can follow. A UAV controller, reviewing the record of IMU data, can infer at time t3 that a launch has occurred and can begin flight operations based upon the UAV data thereafter. The determination can be coupled with other contextual factors (e.g., input from an inductance sensor, pressure sensor, and/or other sensor) to distinguish non-launch behaviors (e.g., passive movement while the UAV is worn), from launch behaviors.

In either of the foregoing embodiments, the system can include a feedback/learning routine. For example, over the course of time, the system can, with feedback from the user, be taught to understand that an imparted acceleration of an amount P corresponds to a desired travel distance of an amount Q. Using this feedback mechanism, the control algorithm can adjust for differences in accelerations provided by different users.

The foregoing techniques for controlling the UAV can be applied to a variety of types of UAVs, including a multirotor vehicle, a helicopter, and/or a fixed-wing aircraft. Depending upon the embodiment, the UAV can also receive further input via voice commands or gestures, which can be detected by an on-board camera of the UAV, or from input provided by a separate device, such as a smart phone or tablet. Additional commands can be used to trigger the camera, and/or direct the UAV to fly additional flight patterns. For example, once the UAV has reached a target location, the user can take over manual control of the UAV and/or can request that the UAV execute one or more pre-programmed flight patterns. In still further embodiments, the UAV can be activated by methods other than the freefall event detection described above Such other embodiments can include detection by a push button (e.g., located on the UAV) or a voice command. The trajectory control can be combined with image processing algorithms, including object tracking. For example, the trajectory control can account for movement by the user. In a particular embodiment, the UAV can move to a turning point and then use computer vision to follow the user at a set offset angle and distance until it is prompted to return.

To enable the foregoing functions and/or to facilitate photography and/or videography, the camera carried by the UAV can swivel around only a single axis (e.g., the X-axis) or multiple axes (e.g., any combination of the X, Y, and Z axes).

As discussed above, the launch gesture or movement can be used to provide additional information beyond simply the desired target location. For example, the additional information can be used to identify the desired pose or orientation of the vehicle once it reaches the target location. In further embodiments, such information can be used to control the manner in which the UAV reaches the target location, and/or other aspects of the flight path of the UAV. For example, if the user executes a swinging gesture (e.g., immediately prior to releasing the UAV) the UAV can be programmed to interpret this movement as a directive to fly in a circle around the user, for example, to capture a panorama.

The UAV can carry any of a suitable combination of sensors to assist in performing its mission and/or navigating and/or controlling the UAV. Such sensors can include radio strength signal sensors, global positioning systems, image processing sensors, air pressure sensors, among others. The sensors can be used to control the limits of the UAVs motion. For example, the sensors can be used to prevent the UAV from flying too high, or too far, or too low, or against obstacles, or into the user. The camera, and in particular an autofocus function of the camera, can receive distance information from an external sensor to more quickly focus on a particular target.

Reference in the present specification to "one embodiment" or "an embodiment" means that a particular feature, structure, or characteristic described in connection with the embodiment is included in at least one embodiment of the disclosed technology. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments, but not for other embodiments.

From the foregoing, it will be appreciated that specific embodiments of the disclosed technology have been described herein for purposes of illustration, but that various modifications may be made without deviating from the technology. For example, the missions carried out by the foregoing UAVs can include tasks in addition to or in lieu of photography and/or videography. Representative tasks include gas detection, amusement (as a toy), and locating objects (e.g., using pattern recognition). Still further suitable missions include:

- obtaining video (e.g., live stream video) from perspectives that are not accessible to the user
- providing a mobile baby monitor or nanny camera function, or providing a close-up view to a parent, guardian, and/or other user
- providing a chaperone function while the user walks in dangerous or dark places
- obtaining pictures and/or video to obtain help in an emergency and/or tag or mark an assailant
- providing assistance to the blind while navigating in public and at home
- providing an assistant and/or beacon functions for victims in a disaster, such as an earthquake or avalanche
- providing assistance to the elderly and/or disables and/or people at risk for injury
- provide an assistant function for rescuers and/or deliver critical resources to victims
- supporting reporters
- engaging in physical games with UAVs using the UAV to obtain a third person view in gaming
- locating and deliver small objects and/or provide assistance in locating such objects (e.g., keys).

While the UAV can be controlled using the gesture-based technique described above, in other embodiments, the UAVs can be controlled using more conventional one-way or two-way radio links. The UAV can use inertial navigation, radio signal strength (e.g., to detect the distance from a user-worn signal transmitter), GPS, and/or other satellite-based techniques for navigation. In still further embodiments, the UAV can be controlled via Bluetooth or other wireless communication links. The flight controller can incorporate a commercially-available component, such as an Arduino® device as the microcontroller, or a 6- or other multi-axis motion sensor available from Invensense, or a radio-frequency receiver available from FlySky™ as a receiver. The UAV can be controlled from other wearable devices, such as a smart phone device. The sensors carried by the UAV can include, in addition to or in lieu of those described above, a GPS sensor, and/or a magnetometer. The pictures taken by the UAV can be stored in a memory located on the UAV and/or transmitted to the user (or another location) via a radio frequency link. When provided to the user, the user can view the information recorded by the UAV, in real-time, or after a transmission delay. The pivotable mount that connects the camera with the UAV can compensate for the orientation of the UAV and/or UAV vibration. As discussed above, the UAV can be incorporated into other devices, for example, the wrist-mounted UAV can be integrated into a smart watch, and/or the glasses configured UAV can be integrated into a smart device such as a Google glass device. The structures described above can have other shapes and/or configurations in other embodiments. For example, the shields 144 described above with reference to FIG. 1 can have different circumferential extents including extents that fully encircle the propellers 143 while the UAV is flying. The UAV can have other numbers of propellers (e.g., 1, 2, 3, or more than 4).

Certain aspects of the technology described in the context of particular embodiments may be combined or eliminated in other embodiments. For example, the control techniques described above with reference to FIGS. 15-18 can be implemented with UAVs having a wearable configuration or a different, non-wearable configuration. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

Further Embodiments

Particular embodiments of the present technology include a UAV that further includes a wearable, flyable support structure, and a propulsion system carried by the support structure. The propulsion system can include a power source and a plurality of propellers. In further particular embodiments, the support structure is changeable between a first configuration in which the support structure is arranged to be worn by a user, and a second configuration in which the support structure is arranged to fly. For example, the support structure can include a boom portion extending along an axis, with the boom portion being curved about the axis in the first configuration, and curved transverse to the axis in the second configuration. The support structure can form a wristband.

In further embodiments, the UAV can include a flight controller. The flight controller can be programmed with instructions that, when executed, direct the UAV from a user to a pre-determined location, direct an on-board camera to take a picture, and direct the UAV to the user. A representative method for operating a UAV in accordance with the present technology includes wearing the UAV, taking the UAV off, launching the UAV on a flight path, retrieving the UAV, and putting the UAV back on. In particular embodiments, the method can further include moving away from the UAV after launching, while the UAV follows.

A further embodiment includes a method for directing the use of a UAV, and includes instructing a user to wear the UAV, take the UAV off, launch the UAV on a flight path, retrieve the UAV, and put the UAV back on. In a particular embodiment, the method can further include programming the UAV with instructions to take a picture of the user while in flight, and/or follow the user while in flight.

Further embodiments of the technology include a computer-implemented method for operating a UAV, which includes detecting at least one parameter of a motion of the UAV as a user releases the UAV for flight, and, based at least in part on the at least one detected parameter, establishing a flight path for the UAV. The method can still further include directing the UAV to fly the flight path. In particular embodiments, the flight path includes a target location, and is the only flight path used by the UAV to reach the target location. In a particular embodiment, detecting at least one parameter includes detecting an acceleration and a direction, with the acceleration correlated with a target distance on the flight path, and with the direction correlated with the direction of the flight path. In further particular embodiments, the flight path includes a first segment in a direction away from the user and a second segment back to the user, with both the first and second segments executed autonomously without external input after the user releases the UAV for flight. In yet a further embodiment, the method can include, in response to sensing the user catching the UAV, and automatically turning off propellers carried by the UAV.

A representative method for manufacturing a UAV includes programming a controller of the UAV with instructions that, when executed, detect at least one parameter of a motion of the UAV as a user releases the UAV for flight. Based at least in part on the at least one detected parameter, the method can further include establishing a flight path for the UAV, and directing the UAV to fly the flight path. Establishing the flight path can include establishing a direction to a target location based at least in part on the direction of the UAV at release. In another embodiment, establishing the flight path can include projecting a vector of the release onto a surface.

To the extent any materials incorporated herein by reference conflict with the present disclosure, the present disclosure controls.

I claim:

1. A computer-implemented method for operating an unmanned aerial vehicle (UAV), comprising:
    detecting at least one parameter of a motion of the UAV as a user releases the UAV for flight;
    projecting a vector of the release on a surface based at least on the detected at least one parameter;
    establishing a flight path for the UAV based at least on one of the projected vector or a position on the surface corresponding to the projected vector; and
    directing the UAV to fly the flight path.

2. The method of claim 1 wherein the flight path includes a target location, and wherein the flight path is the only flight path used by the UAV to reach the target location.

3. The method of claim 1 wherein detecting at least one parameter includes detecting an acceleration.

4. The method of claim 1 wherein detecting at least one parameter includes detecting a direction.

5. The method of claim 1 wherein detecting the at least one parameter includes detecting an acceleration and a direction, and wherein the acceleration is correlated with a target distance on the flight path, and wherein the direction is correlated with a direction of the flight path.

6. The method of claim 1 further comprising:
    determining the flight path, including determining a target orientation of the UAV at a target location on the flight path, wherein the target orientation includes an orientation in which the UAV is facing a user.

7. The method of claim 1 wherein the motion includes a release from the user's hand during launch.

8. The method of claim 1, wherein the surface is a flat surface.

9. The method of claim 1 wherein the flight path includes a first segment in a direction away from the user and a second segment back to the user, with both the first and second segments executed autonomously without external input after the user releases the UAV for flight.

10. The method of claim 1 wherein the flight path includes a first segment in a direction away from the user and a second segment back to the user, and wherein the method further comprises:
    in response to sensing the user catching the UAV, automatically turning off propellers carried by the UAV.

11. The method of claim 10, further comprising sensing the user catching the UAV, and wherein the sensing includes sensing an acceleration.

12. The method of claim 1 wherein the flight path includes a segment in a direction away from the user, and wherein the method further comprises directing the UAV to turn toward the user based on the direction of the segment.

13. The UAV of claim 12, further comprising directing the UAV to capture an image of the user when turned toward the user.

14. A propulsion system for an unmanned aerial vehicle (UAV) that includes a flyable support structure that caries the propulsion system, the system comprising:
    a power source;
    at least one propeller; and
    a sensor carried by the support structure and coupled to the power source, the sensor being configured to detect at least one parameter of a motion of the UAV as a user releases the UAV for flight, wherein the at least one parameter of the motion includes a direction of motion of the UAV as the user releases the UAV; and
    a controller operatively coupled to the sensor and programed with instructions that, when executed, perform actions including:
    receive an indication of the at least one parameter;
    based at least in part on the at least one parameter, establish a flight path for the UAV that includes a target location and establish a direction to the target location based at least in part on the direction of motion of the UAV as the user releases the UAV; and
    direct the UAV to fly the flight path.

15. The system of claim 14 wherein the flight path is the only flight path used by the UAV to reach the target location.

16. The system of claim 14 wherein the flyable support structure is a wearable support structure.

17. The system of claim 14 wherein the sensor includes an accelerometer.

18. The system of claim 17, the actions further include:
    employ the accelerometer to determine one or more accelerations of the UAV;
    when at least one of the one or more accelerations is less than a first acceleration threshold, detect a freefall event and initiate operating the power source; and
    when the at least one of the one or more accelerations is greater than a second acceleration threshold, detect a catch event and terminate operating the power source.

19. The system of claim 14 wherein the UAV includes a camera and the actions further include:
    automatically orient the camera toward the user.

20. The system of claim 14 wherein the at least one parameter of motion further includes an absolute value of a throw velocity vector and the direction of motion of the UAV includes a first angle of the throw velocity vector and a second angle of the throw velocity vector, and the actions further include:
    determine a turning point of the UAV based on each of the absolute value of the throw velocity angle, the first angle of the throw velocity vector, and the second angle of the throw velocity vector.

21. A method for manufacturing an unmanned aerial vehicle (UAV), comprising:

programming a controller of the UAV with instructions, that, when executed, perform actions comprising:

detect at least one parameter of a motion of the UAV as a user releases the UAV for flight, wherein the at least one parameter includes an acceleration of the UAV;

based at least in part on the detected at least one parameter, establish a flight path for the UAV that includes a target location and establish a distance to the target location that is correlated with the acceleration of the UAV; and direct the UAV to fly the flight path.

22. The method of claim 21 wherein detecting at least one parameter includes detecting a direction of the UAV at release, and wherein establishing a flight path includes establishing a direction to the target location based at least in part on the direction of the UAV at release.

23. The method of claim 21 wherein establishing the flight path includes projecting a vector of the release onto a surface.

24. The method of claim 21 wherein the at least one parameter further includes an axis of a spin of the UAV provided by the user and the flight path is further based on a surface that corresponds to the axis of the spin.

25. The method of claim 21 the actions further comprising:

employ an inductance sensor to detect the user releasing the UAV for flight; and in response to detecting the user releasing the UAV for flight, initiate flight operations of the UAV.

26. The method of claim 21 the actions further comprising:

prior to the user releasing the UAV, detect a swinging gesture of the user; and in response to detecting the swinging gesture of the user, establish the flight path to further include a circle around the user.

* * * * *